US 8,595,205 B2

(12) United States Patent
Matsusaka

(10) Patent No.: US 8,595,205 B2
(45) Date of Patent: Nov. 26, 2013

(54) DEVICE AND METHOD FOR MANAGING SEARCH CONDITIONS

(75) Inventor: Katsuhiko Matsusaka, Amagasaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 837 days.

(21) Appl. No.: 12/365,569

(22) Filed: Feb. 4, 2009

(65) Prior Publication Data

US 2009/0204918 A1 Aug. 13, 2009

(30) Foreign Application Priority Data

Feb. 8, 2008 (JP) ................................. 2008-028866

(51) Int. Cl.
*G06F 7/00* (2006.01)
*G06F 17/30* (2006.01)

(52) U.S. Cl.
USPC .......................................... 707/706; 707/758

(58) Field of Classification Search
USPC ......... 707/821, 829, 830, 831, 736, 754, 705, 707/706, 758
See application file for complete search history.

(56) References Cited

U.S. PATENT DOCUMENTS

| 5,832,470 | A | 11/1998 | Morita et al. | |
|---|---|---|---|---|
| 6,895,407 | B2 * | 5/2005 | Romer et al. | 348/722 |
| 7,305,389 | B2 * | 12/2007 | Zeng et al. | 707/721 |
| 2002/0073065 | A1 * | 6/2002 | Inaba et al. | 707/1 |
| 2005/0216453 | A1 * | 9/2005 | Sasaki et al. | 707/3 |
| 2005/0289100 | A1 * | 12/2005 | Dettinger et al. | 707/1 |
| 2006/0020576 | A1 * | 1/2006 | Karube | 707/2 |

FOREIGN PATENT DOCUMENTS

| JP | 08-153121 | A | 6/1996 |
|---|---|---|---|
| JP | 09-146976 | A | 6/1997 |
| JP | 10-154154 | A | 6/1998 |
| JP | 11-003343 | | 1/1999 |
| JP | 11-110404 | | 4/1999 |
| JP | 2002-183200 | | 6/2002 |
| JP | 2002-251403 | A | 9/2002 |
| JP | 2002-259443 | | 9/2002 |
| JP | 2002-288016 | | 10/2002 |
| JP | 2003-167908 | | 6/2003 |
| JP | 2006-107375 | A | 4/2006 |

OTHER PUBLICATIONS

Notification of Reason (s) for Refusal issued in the corresponding Japanese Patent Application No. 2008-028866 dated Oct. 6, 2009, and an English Translation thereof.
Office Action (Notification of Reason (s) for Refusal) dated Jul. 3, 2012 Issued in corresponding Japanese Patent Application No. 2010-127607, and an English Translation thereof. (6 pages).

* cited by examiner

*Primary Examiner* — Marc Somers
(74) *Attorney, Agent, or Firm* — Buchanan Ingersoll & Rooney PC

(57) ABSTRACT

An organization process execution portion 64 is provided in a file management system 1 that has a function to manage files and search folders and a function to search files. When a search condition has been newly designated by a user, if the designated search condition does not match the search condition of any existing search folder, the organization process execution portion 64 generates a new search folder in which the designated search condition is indicated. If the designated search condition matches the search condition of an existing search folder, a new search folder is not generated.

14 Claims, 30 Drawing Sheets

FIG. 3

TLF

| PARENT FOLDER PATH | FOLDER NAME |
|---|---|
| D:¥ | WORK |
| D:¥ | GROUP 1 |
| D:¥WORK | PROJECT A |
| D:¥WORK | PROJECT B |
| ⋮ | ⋮ |

FIG. 4

TLD

| FOLDER PATH | FILE NAME | TYPE | SIZE | UPDATE TIME |
|---|---|---|---|---|
| D:¥WORK¥PROJECT A | REPORT | WORD PROCESSING | 30KB | 2007/9/20 17:30 |
| D:¥WORK¥PROJECT A | PROCESS SCHEDULE | SPREADSHEET | 50KB | 2007/6/15 15:28 |
| D:¥WORK¥PROJECT B | MEETING MEMO | MEMO | 25KB | 2007/10/3 9:11 |
| ... | ... | ... | ... | ... |

FIG. 5

TLK

| PARENT FOLDER PATH | SEARCH FOLDER NAME | SEARCH CONDITIONS |
|---|---|---|
| D:¥ | PROJECT A RELATED | ○○○··· |
| D:¥ | SCHEDULE | △△△··· |
| D:¥PROJECT A RELATED | 2007 OR LATER | □□□··· |
| D:¥WORK¥PROJECT B | FILES FROM SEPTEMBER OR LATER | ×××··· |
| ⋮ | ⋮ | ⋮ |

FIG. 9A
TP1(TP)

(a_1) : delete the folder 'selected folder path', and leave the folder 'compared folder path'
(a_2) : delete the folder 'compared folder path', and leave the folder 'selected folder path'

FIG. 9B
TP2(TP)

(b_1) : delete the folder 'selected folder path', and leave the folder 'compared folder path'
(b_2) : delete the folder 'compared folder path', and leave the folder 'selected folder path'
(b_3) : set the folder 'selected folder path' as a sub-folder of the folder 'compared folder path'
(b_4) : leave both folders as they are

FIG. 9C
TP3(TP)

(c_1) : delete the folder 'compared folder path', and leave the folder 'selected folder path'
(c_2) : delete the folder 'selected folder path', and leave the folder 'compared folder path'
(c_3) : set the folder 'compared folder path' as a sub-folder of the folder 'selected folder path'
(c_4) : leave both folders as they are

FIG. 9D
TP4(TP)

(d_1) : delete the folder 'compared folder path', and leave the folder 'selected folder path'
(d_2) : delete the folder 'selected folder path', and leave the folder 'compared folder path'
(d_3) : combine the folder 'selected folder path' and the folder 'compared folder path'
(d_4) : leave both folders as they are

(e_1) : Discard search condition 'new search condition' of new search folder, and perform search with search condition 'existing search condition' of existing search folder that is similar. Do not create new search folder.

(e_2) : Create new search folder in save location designated by the user, and perform search with that search condition 'new search condition'. Delete similar existing search folder 'existing folder path' (search folder having 'existing search condition').

(e_3) : Perform search with search condition 'new search condition' of new search folder, and create new search folder. However, create that new search folder as a sub-search folder of a similar existing search folder 'existing folder path' (search folder having 'existing search condition').

(e_4) : Perform search with the search condition 'new search condition' of new search folder, and create new search folder in save location designated by the user.

(f_1) : Discard search condition 'new search condition' of new search folder, and perform search with search condition 'existing search condition' of existing search folder that is similar. Do not create new search folder.

(f_2) : Create new search folder in save location designated by the user, and perform search with that search condition 'new search condition'. Delete similar existing search folder 'existing folder path' (search folder having 'existing search condition').

(f_3) : Perform search with search condition 'new search condition' of new search folder, and create new search folder in save location designated by the user. Further, change similar existing search folder 'existing folder path' (search folder having 'existing search condition') to a sub-search folder of that new search folder.

(f_4) : Perform search with the search condition 'new search condition' of new search folder, and create new search folder in save location designated by the user.

(g_1) : Discard search condition 'new search condition' of new search folder, and perform search with search condition 'existing search condition' of existing search folder that is similar. Do not create new search folder.

(g_2) : Create new search folder in save location designated by the user, and perform search with that search condition 'new search condition'. Delete similar existing search folder 'existing folder path' (search folder having 'existing search condition').

(g_3) : Search for files and normal folders that satisfy search condition 'new search condition' of new search folder or search condition 'existing search condition' of existing search folder that is similar. Instead of creating that new search folder, add the search condition of that new search folder as an OR condition to the search condition of the existing search folder.

(g_4) : Perform search with the search condition 'new search condition' of new search folder, and create new search folder in save location designated by the user.

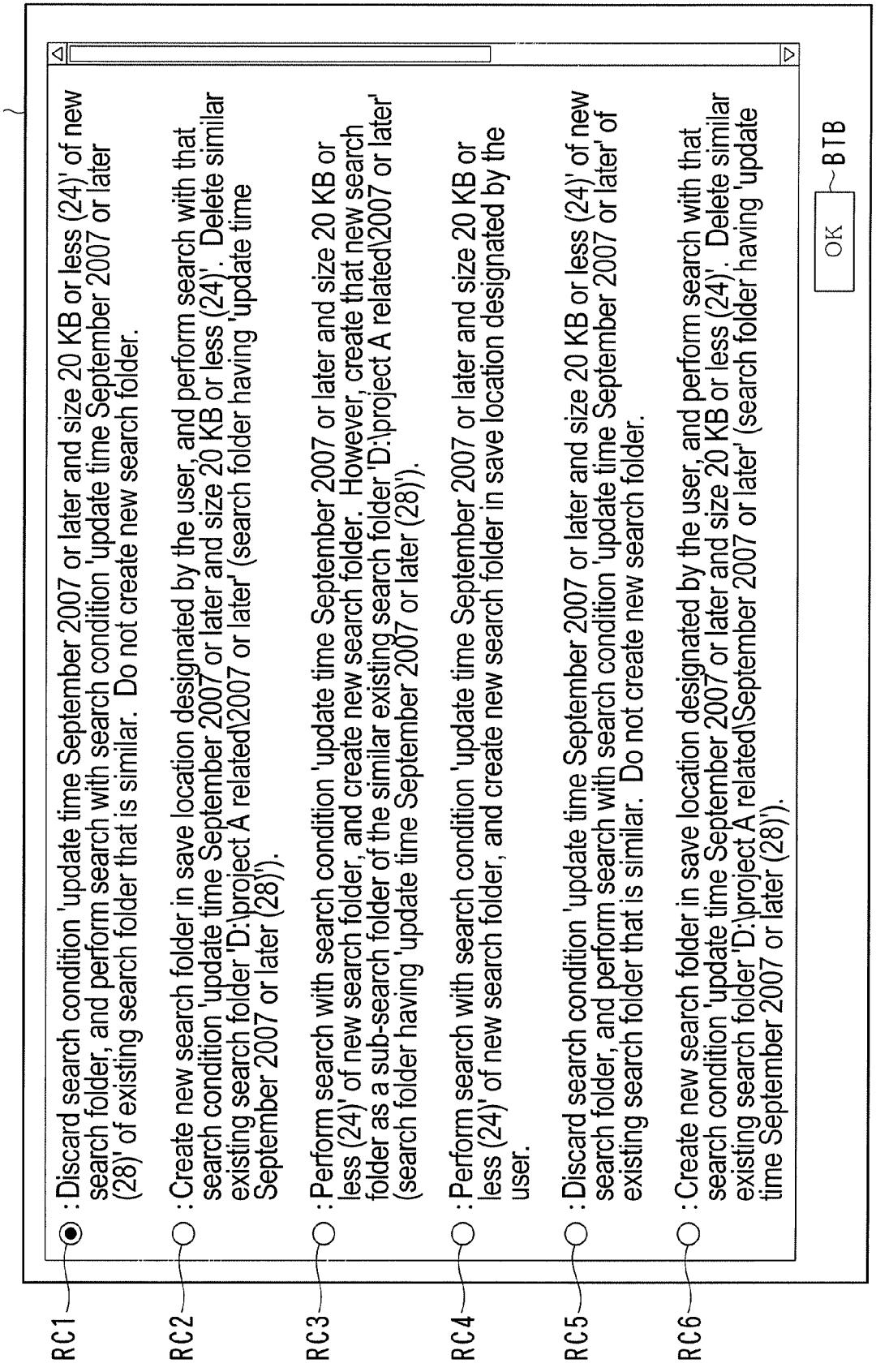

FIG. 16

| PROJECT A RELATED (SEARCH FOLDER) | | | |
|---|---|---|---|
| NAME | SIZE | TYPE | UPDATE TIME |
| REPORT_PROJECT A | 30KB | WORD PROCESSING | 2007/9/20 17:30 |
| MEETING MEMO (PROJECT A) | 25KB | TEXT | 2007/10/3 9:11 |
| PROJECT A | | FOLDER | 2006/2/18 8:20 |
| 2007 OR LATER | | SEARCH FOLDER | 2005/3/23 21:05 |

GMK

(h_1): Do not create a new search folder with 'new search condition', and hereafter, use the existing search folder 'existing folder path' (search folder having 'existing search condition') with identical search results.

(h_2): Create new search folder in the save location designated by the user.

(i_1): Do not create a new search folder with 'new search condition', and hereafter, use the existing search folder 'existing folder path' (search folder having 'existing search condition') with similar search results.

(i_2): Create new search folder with 'new search condition' in save location designated by the user, and delete existing search folder 'existing folder path' (search folder having 'existing search condition') with search results similar to the new search folder.

(i_3): Create new search folder as sub-search folder of existing search folder 'existing folder path' (search folder having 'existing search condition') with search results similar to the new search folder.

(i_4): Create new search folder in the save location designated by the user.

FIG. 18C                                                                          TP10(TP)

(j_1): Do not create a new search folder with 'new search condition', and hereafter, use the existing search folder 'existing folder path' (search folder having 'existing search condition') with similar search results.
(j_2): Create new search folder with 'new search condition' in save location designated by the user, and delete existing search folder 'existing folder path' (search folder having 'existing search condition') with search results similar to the new search folder.
(j_3): Create new search folder with 'new search condition' in save location designated by the user, and change existing search folder 'existing folder path' (search folder having 'existing search condition') with search results similar to the new search folder to a sub-search folder of the new search folder.
(j_4): Create new search folder in the save location designated by the user.

FIG. 18D                                                                          TP11(TP)

(k_1): Do not create a new search folder with 'new search condition', and hereafter, use the existing search folder 'existing folder path' (search folder having 'existing search condition') with similar search results.
(k_2): Create new search folder with 'new search condition' in save location designated by the user, and delete existing search folder 'existing folder path' (search folder having 'existing search condition') with search results similar to the new search folder.
(k_3): Instead of creating a new search folder, add the search condition 'new search condition' of that new search folder as an OR condition to the search condition 'existing search condition' of the existing search folder with search results similar to the new search folder.
(k_4): Create new search folder in the save location designated by the user.

FIG. 19

RD1: Do not create new search folder for 'update time September 2007 or later and size 20 KB or less (24)', and hereafter, use the existing search folder 'D:\work\project A\September 2007 or later' (search folder having 'update time September 2007 or later and size 20 KB or less (24)') with identical search results.

RD2: Create new search folder in the save location designated by the user.

RD3: Do not create new search folder for 'update time September 2007 or later and size 20 KB or less (24)', and hereafter, use the existing search folder 'D:\project A related\August 2007 or later' (search folder having 'update time August 2007 or later and size 20 KB or less (25)') with similar search results.

RD4: Create new search folder for 'update time September 2007 or later and size 20 KB or less (24)' in the save location designated by the user, and delete the existing search folder 'D:\project A related\August 2007 or later' (search folder having 'update time August 2007 or later and size 20 KB or less (25)') with search results similar to the new search folder.

RD5: Create new search folder as sub-search folder of the existing search folder 'D:\project A related\August 2007 or later' (search folder having 'update time August 2007 or later and size 20 KB or less (25)') with search results similar to the new search folder.

RD6: Create new search folder in the save location designated by the user.

GMT3

BTC — OK

(L_1) : Delete the search folder 'first path' with the search condition 'first search condition', and leave the search folder 'second path' (search folder having 'second search condition') with search results identical to that search folder.

(L_2) : Delete the search folder 'second path' with the search condition 'second search condition', and leave the search folder 'first path' (search folder having 'first search condition') with search results identical to that search folder.

(L_3) : Leave both the search folder 'first path' with the search condition 'first search condition', and the search folder 'second path' (search folder having 'second search condition') with search results identical to that search folder.

(m_1) : Delete the search folder 'first path' with the search condition 'first search condition', and leave the search folder 'second path' (search folder having 'second search condition') with search results similar to that search folder.

(m_2) : Delete the search folder 'second path' with the search condition 'second search condition', and leave the search folder 'first path' (search folder having 'first search condition') with search results similar to that search folder.

(m_3) : Change the search folder 'first path' with the search condition 'first search condition' to a sub-search folder of the search folder 'second path' (search folder having 'second search condition') with search results similar to that search folder.

(m_4) : Change the search folder 'second path' with the search condition 'second search condition' to a sub-search folder of the search folder 'first path' (search folder having 'first search condition') with search results similar to that search folder.

(m_5) : Leave both the search folder 'first path' with the search condition 'first search condition', and the search folder 'second path' (search folder having 'second search condition') with search results similar to that search folder.

(n_1): Delete the search folder 'first path' with the search condition 'first search condition', and leave the search folder 'second path' (search folder having 'second search condition') with search results similar to that search folder.

(n_2): Delete the search folder 'second path' with the search condition 'second search condition', and leave the search folder 'first path' (search folder having 'first search condition') with search results similar to that search folder.

(n_3): Add the search condition 'first search condition' of the search folder 'first path' as an OR condition to the search condition 'second search condition' of the search folder 'second path' with search results similar to that search folder. Delete the search folder 'first path'.

(n_4): Add the search condition 'second search condition' of the search folder 'second path' as an OR condition to the search condition 'first search condition' of the search folder 'first path' with search results similar to that search folder. Delete the search folder 'second path'.

(n_5): Leave both the search folder 'first path' with the search condition 'first search condition', and the search folder 'second path' (search folder having 'second search condition') with search results similar to that search folder.

FIG. 22

RE1 ⦿ : Delete the search folder 'D:\word processing 1' with the search condition "type is word processing and size is 10 KB or less (10)', and leave the search folder 'D:\word processing 2' (search folder having "type is word processing and size is 15 KB or less (10)") with search results identical to that search folder.

RE2 ○ : Delete the search folder 'D:\word processing 2' with the search condition "type is word processing and size is 15 KB or less (10)', and leave the search folder 'D:\word processing 1' (search folder having "type is word processing and size is 10 KB or less (10)") with search results identical to that search folder.

RE3 ○ : Leave both the search folder 'D:\word processing 1' with the search condition "type is word processing and size is 10 KB or less (10)', and the search folder 'D:\word processing 2' (search folder having "type is word processing (11)") with search results identical to that search folder.

RE4 ○ : Delete the search folder 'D:\word processing 1' with the search condition "type is word processing and size is 10 KB or less (10)', and leave the search folder 'D:\word processing 1' (search folder having "type is word processing (11)") with search results similar to that search folder.

RE5 ○ : Delete the search folder 'D:\word processing 1' with the search condition "type is word processing (11)', and leave the search folder 'D:\word processing 1' (search folder having "type is word processing and size is 10 KB or less (10)") with search results similar to that search folder.

RE6 ○ : Change the search folder 'D:\word processing 1' with the search condition "type is word processing and size is 10 KB or less (10)' to···

[ OK ] ~BTD

DEVICE AND METHOD FOR MANAGING SEARCH CONDITIONS

This application is based on Japanese patent application No. 2008-028866 filed on Feb. 8, 2008, the contents of which are hereby incorporated by reference.

BACKGROUND OF THE INVENTION

1. Field of the Invention

The present invention relates to a method for managing folders, a computer in which that method is applied, and the like.

2. Description of the Related Art

A personal computer is ordinarily widely used as a tool for saving data. Data is saved as files to a hard disk of a personal computer. Folders are provided on the hard disk for each of a plurality of categories, and the files are saved classified in the folders corresponding to those categories. In those folders, folders are further provided, so that it is possible to hierarchically manage the files.

Normally, the number of files saved to the hard disk increases as the personal computer continues to be used. Therefore, it becomes difficult for a user to quickly find a necessary file.

Consequently, the personal computer is provided with a function to search for files and folders. As technology related to searching, a method is disclosed for predicting search results and presenting this information to a user (JP H10-154154A).

Recently, an OS, mailer software, or the like is equipped with a function called a 'search folder' for repeating a search that the user has performed in the past and displaying those search results. With this function, it is possible for the user to save the search conditions when a file or folder search was performed as data with the name 'search folder'. The icon of this search folder looks like the icon of a conventional folder. When the user performs an operation to open that search folder, as in the case of browsing the contents of a conventional folder, the computer searches for files and folders that satisfy those search conditions, and displays those files and folders as if they have been stored in the search folder.

SUMMARY

It is conceivable that when a personal computer is used for a long period of time, the number of conventional folders (normal folders) and search folders will become very large. In this case, the user may forget about existing conventional folders or search folders and newly create a folder (a conventional folder or a search folder) having the same object as the forgotten folder. When such work is repeated, the number of folders is wastefully increased more and more. Also, the hierarchical structure of the folders becomes more complicated, so it becomes more and more difficult to retrieve the target file or folder.

The present invention was made in view of such problems, and it is an object thereof to suppress wasteful increase of folders in a computer system.

According to one aspect of the present invention, a data management device includes a search condition information storage portion storing one or more pieces of search condition information, each piece of the search condition information indicating a search condition, a data retrieval portion retrieving, from a storage medium, when a piece of the search condition information is designated, data satisfying the search condition indicated in the piece of the search condition information, and a search condition information adding portion causing, when a new search condition is designated by a user and the new search condition does not match any of the search conditions indicated in any pieces of the search condition information, the search condition information storage portion to store a piece of information indicating the new search condition as one piece of the search condition information.

According to another aspect of the present invention, a file management device for placing files stored in a storage medium in folders on a file-by-file basis or on a files-by-files basis to manage the files, includes an identical folder detector detecting two of the folders, said two folders containing an identical file, and a folder deletion portion deleting one of said two folders when the identical folder detector detects said two folders.

According to the structure described above, it is possible to suppress wasteful increase of folders. Accordingly, a user can manage files more easily than with the conventional technology.

BRIEF DESCRIPTION OF THE DRAWINGS

FIG. 3 shows an example of a normal folder information table.

FIG. 4 shows an example of a file information table.

FIG. 5 shows an example of a search folder information table.

FIGS. 9A to 9D show examples of a template of selections that are presented to a user.

FIGS. 14A to 14C show examples of a template of selections that are presented to a user.

FIG. 15 shows an example of a selection presenting screen.

FIG. 16 shows an example of a search result display screen.

FIGS. 18A to 18D show examples of a template of selections that are presented to a user.

FIG. 19 shows an example of a selection presenting screen.

FIGS. 21A to 21C show examples of a template of selections that are presented to a user.

FIG. 22 shows an example of a selection presenting screen.

DESCRIPTION OF THE PREFERRED EMBODIMENTS

Figure 1:
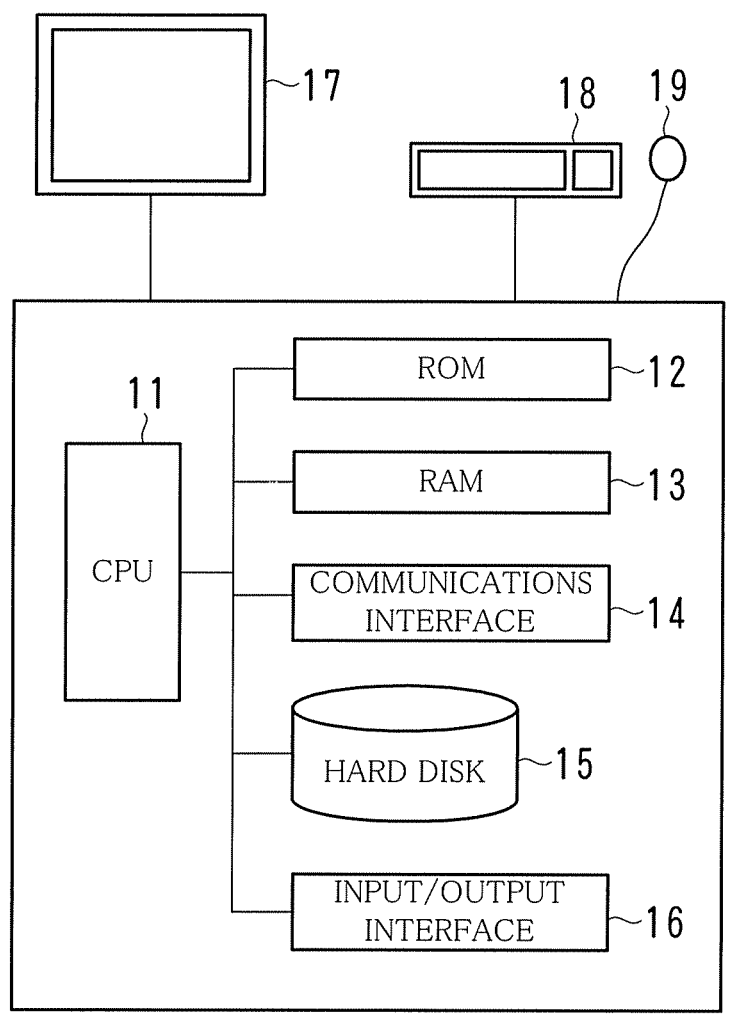
FIG. 1 shows an example of the hardware configuration of a file management system.

FIG. 1 shows an example of the hardware configuration of a file management system 1.

A file management system 1 is a system for managing electronic files (referred to below as simply 'files') that reproduce documents, images, moving images, audio, or the like. A personal computer, a workstation, or the like is used as the file management system 1.

As shown in FIG. 1, the file management system 1 is configured from a CPU 11, a ROM 12, a RAM 13, a communications interface 14, a hard disk 15, an input/output interface 16, a display 17, a keyboard 18, and a mouse 19.

An OS (Operating System) and various application programs are installed in the ROM 12 and the hard disk 15.

This OS provides a search folder function. As described in the 'Description of the Related Art' section, with this function, it is possible for a user to save the search conditions when a file or folder search was performed as data with the name 'search folder'. The icon of this search folder looks like the icon of a conventional (normal) folder. When the user performs an operation to open that search folder, as in the case of browsing the contents of a conventional folder, the file management system 1 searches for files and folders that satisfy those search conditions, and displays icons of those files and folders in a window as if those files and folders have been stored in the search folder (see FIG. 16). A pre-indexing process is performed on the files, so high speed searching is possible.

Below, a conventional (normal) folder is referred to as a 'normal folder' in order to distinguish from a search folder.

The user can cause the file management system 1 to manage a plurality of such search folders. A search folder can be saved in a root folder (root directory) or in any normal folder. Like a normal folder, a search folder has a folder name.

That is, after a user has executed a search of files or normal folders, if the user judges that there is a possibility that the search conditions of that search will be used also in the future, then the user performs an operation to save those search conditions. Thus, the file management system 1 creates a search folder for those search conditions and saves the search folder at a predetermined location (a root folder or a normal folder).

Also, it is possible to cause the search folder to include data that indicates another search condition. This data is handled as a search folder that is one level below this search folder. Below, a search folder that is one level below a particular search folder is referred to as a 'sub-search folder' and a search folder that is one level above is referred to as a 'parent search folder'. Also, 'a sub-search folder is saved in a search folder' expresses that a sub-search folder is included in a search folder.

In a case where a sub-search folder is saved in a search folder, when the user performs an operation to open that search folder, the file management system 1 searches for files and normal folders covered by the search conditions of that search folder, and displays icons of those files and normal folders along with the icon of that sub-search folder in a single window. Furthermore, when the user performs an operation to open that sub-search folder, the file management system 1 searches for items covered by the search conditions of that sub-search folder, and displays icons of those items in a single window. In a case where a further sub-search folder exists in that sub-search folder, the icon of that further sub-search folder is displayed together with those icons.

As with the conventional technology, the user can save another normal folder within a normal folder. That is, the file management system 1 can hierarchically manage normal folders. Below, a normal folder that is one level above a particular normal folder is referred to as a 'parent normal folder' and a normal folder that is one level below is referred to as a 'sub-normal folder'.

Note that, as described above, a search folder may be saved in a parent search folder, or may be saved in a normal folder or a root folder. When a search folder is saved in a normal folder, that normal folder is referred to as a 'parent normal folder' from the perspective of this search folder.

Programs and data for realizing each function shown in FIG. 2, described below, are also installed to the ROM 12 and the hard disk 15. These programs and data are read out to the RAM 13 as necessary, and the programs are executed by the CPU 11.

The communications interface 14 is an interface for performing communications with another device. A NIC (Network Interface Card), a modem, or the like is used as the communications interface 14.

The keyboard 18 and the mouse 19 are input devices for a user to give instructions (commands) to the file management system 1.

Connected to the input/output interface 16 are a keyboard 18, a mouse 19, and an external media drive (for example, such as an external hard disk drive, an external MO (Magneto Optical Disk) drive, or USB (Universal Serial Bus) memory. USB, RS-232C, or the like is used for the input/output interface 16.

The display 17 is a CRT display, a liquid crystal display, or the like that displays the windows described above, for example.

The file management system 1 searches for two normal folders that are identical or similar, using the functions of each part shown in FIG. 6, described below. When such normal folders are found, normal folder organization is performed by combining the two normal folders or deleting one of the two normal folders. 'Normal folder deletion' means deleting all of the files that are saved (belong to) that normal folder, and each folder immediately below that normal folder. In other words, 'normal folder deletion' means the same as deletion of a folder or a directory in, for example, MICROSOFT WINDOWS and the APPLE MAC OS.

Also, the file management system 1 searches for two search folders that are identical or similar, and two search folders whose search results are identical or similar, using the functions of each part shown in FIG. 12, described below. When such search folders are found, search folder organization is performed by combining the two search folders or deleting one of the two search folders.

Later there will be a description of what sort of normal folders are identical or similar, what sort of search folders are identical or similar, and what sort of search results are identical or similar.

Figure 2:
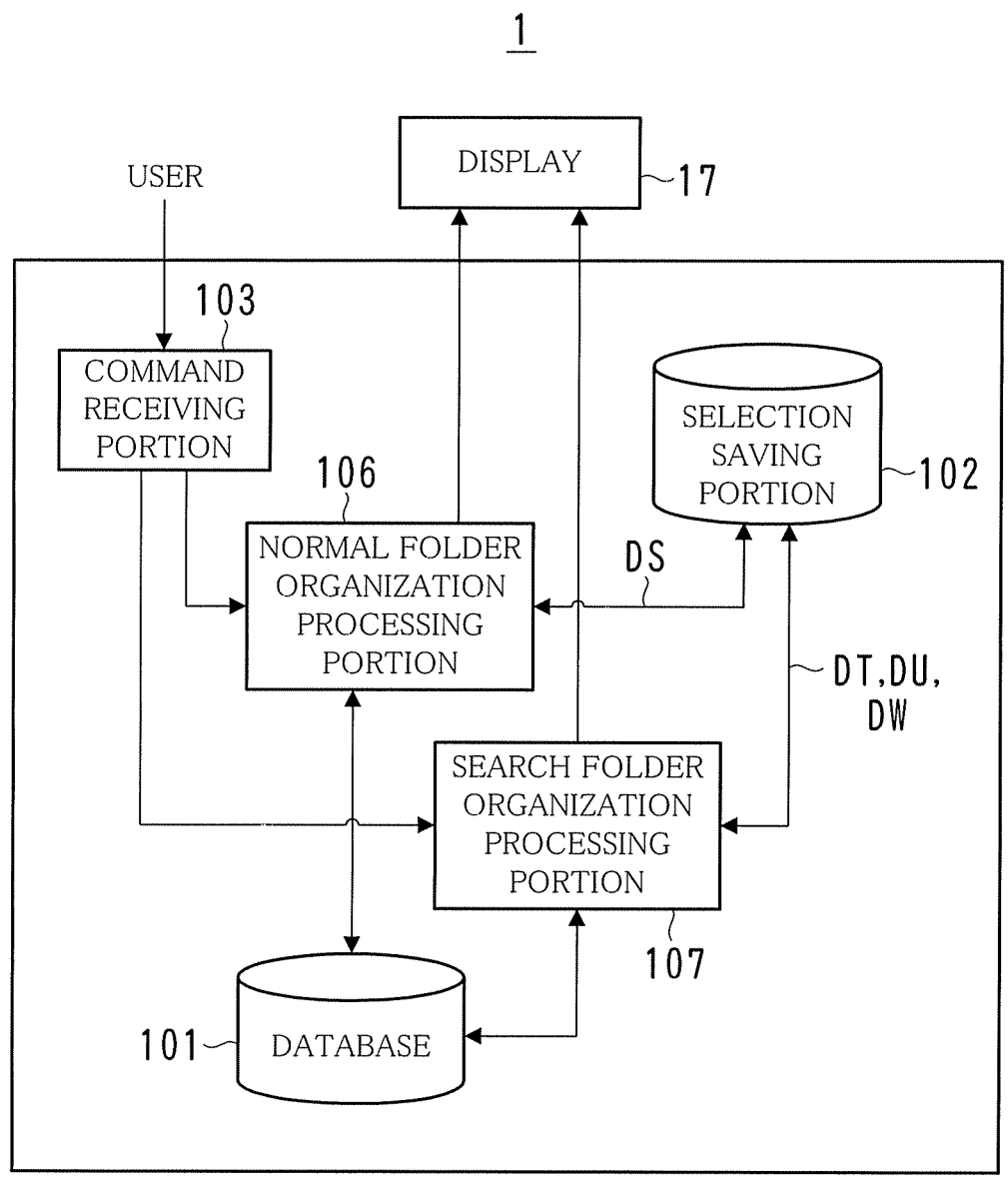
FIG. 2 shows an example of the functional configuration of a file management system.
Figure 6:
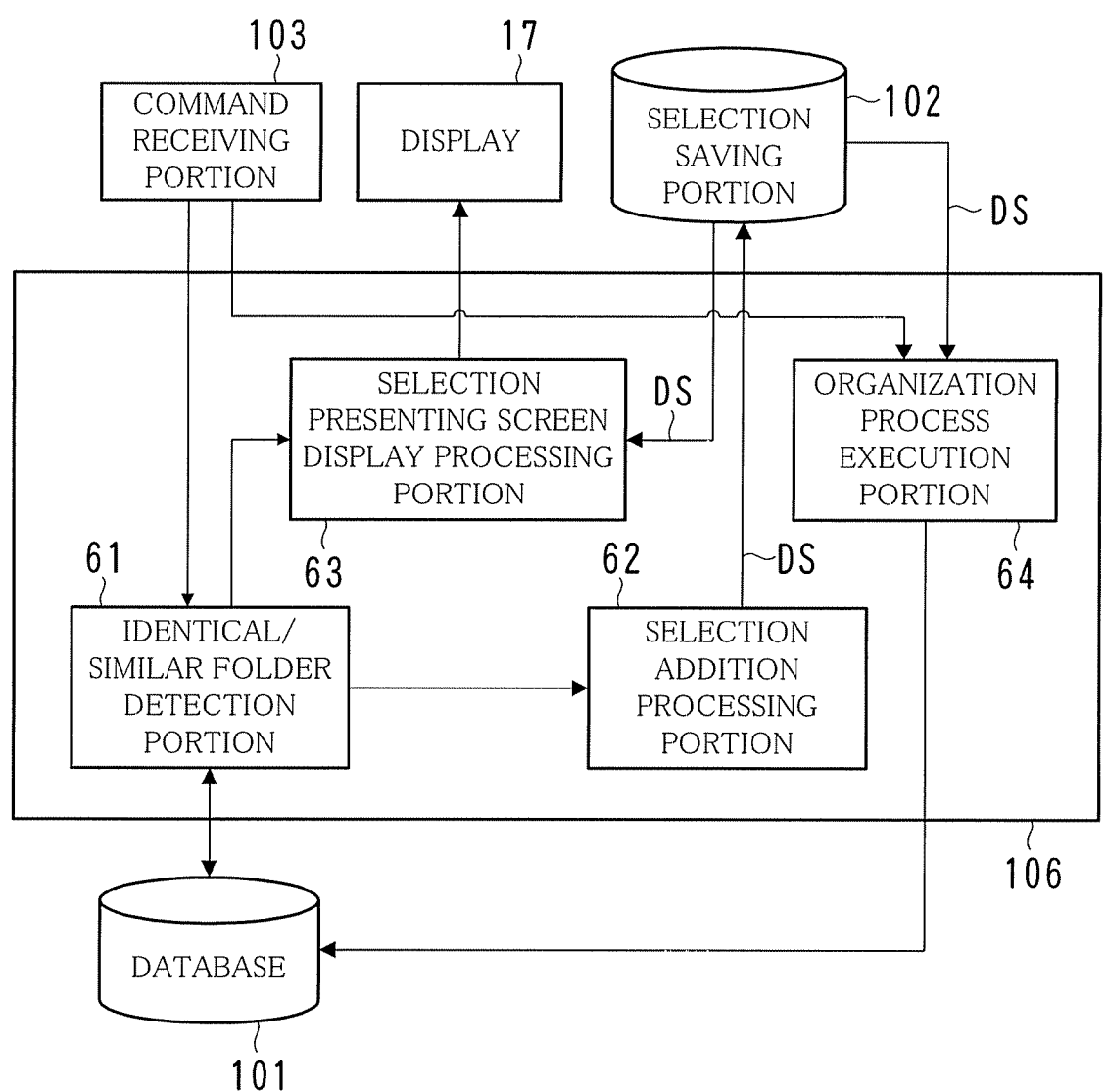
FIG. 6 shows an example of the configuration of a normal folder organization processing portion.
Figure 12:
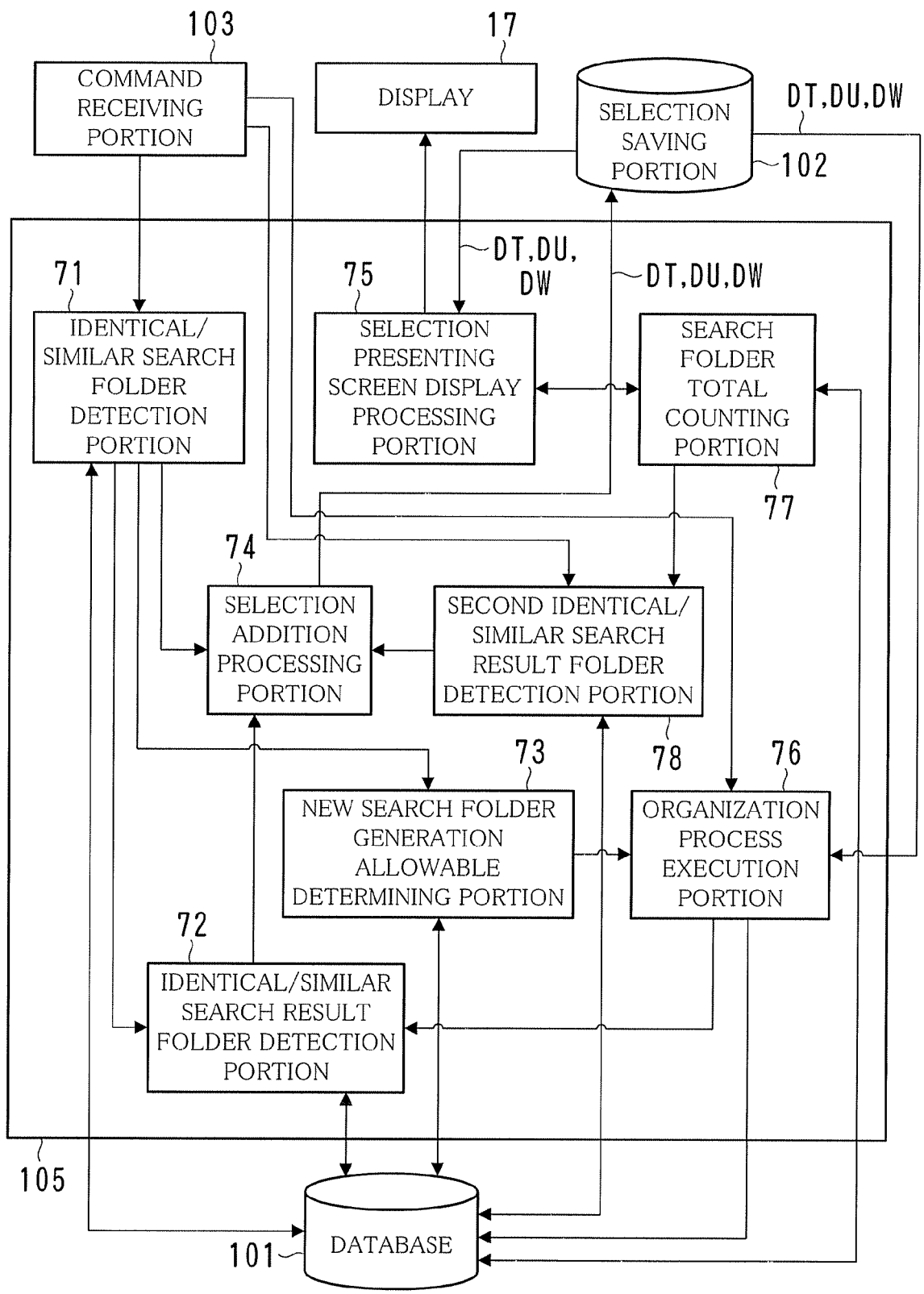
FIG. 12 shows an example of the configuration of a search folder organization processing portion.

Following is a description of a normal folder organization process and a search folder organization process, with reference to FIGS. 2, 6, and 12, in order.

FIG. 2 shows an example of the functional configuration of the file management system 1, FIG. 3 shows an example of a normal folder information table TLF, FIG. 4 shows an example of a file information table TLD, and FIG. 5 shows an example of a search folder information table TLK.

As shown in FIG. 2, the file management system 1 is configured from a database 101, a selection saving portion 102, a command receiving portion 103, a normal folder organization processing portion 106, and a search folder organization processing portion 107.

The database 101 saves the normal folder information table TLF, the file information table TLD, and the search folder information table TLK.

Stored in the normal folder information table TLF are records that indicate the attributes of each normal folder that is saved to a storage medium (below, 'managed storage medium') managed by the file management system 1 itself. Specifically, as shown in FIG. 3, records are stored that indicate, for each normal folder, the name (folder name) of that normal folder and the absolute path (parent folder path) of the parent normal folder.

Stored in the file folder information table TLD are records that indicate the attributes of each file that is saved to the managed storage medium. Specifically, as shown in FIG. 4, records are stored that indicate, for each file, the name (file name), type, size, and update time of that file, and the absolute path (folder path) of the normal folder in which that file is saved. Based on such records, each part, described later, can call files from the managed storage medium.

Stored in the search folder information table TLK are records that indicate the attributes of each search folder that is saved to the managed storage medium. Specifically, as shown in FIG. 5, records are stored that indicate, for each search folder, the name (search folder name) of that search folder, the absolute path (parent folder path) of the parent normal folder or the parent search folder, and search conditions.

Returning to FIG. 2, the selection saving portion 102 saves selection data DS, DT, DJ, or DW, described later. Each time that the normal folder organization process is completed, the selection saving portion 102 is reset, and all of the selection data DS that was saved is deleted. Also, each time that a new search folder generation limiting process or an existing search folder organization process is completed, the selection saving portion 102 is reset, and all of the selection data DT, DU, or DW that was saved is deleted.

The command receiving portion 103 receives a command, a search condition, or the like that is input by the user using the keyboard 18 or the mouse 19.

The normal folder organization processing portion 106, according to a command that has been received by the command receiving portion 103, performs the normal folder organization process. The search folder organization processing portion 105, according to a command that has been received by the command receiving portion 103, performs the new search folder generation limiting process and the existing search folder organization process. Following is a detailed description of the normal folder organization processing portion 106 and the search folder organization processing portion 105, in order.

[Normal Folder Organization Process]

Figure 7A:
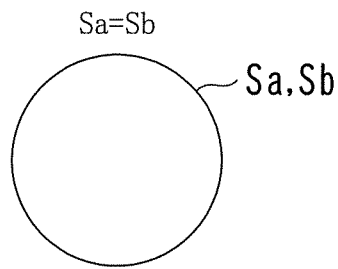
FIGS. 7A to 7C show the relationship between sets.
Figure 7B:
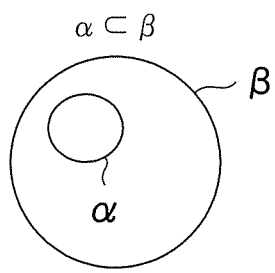
Figure 7C:
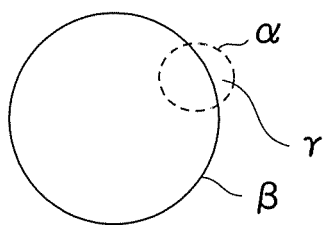
Figure 8:
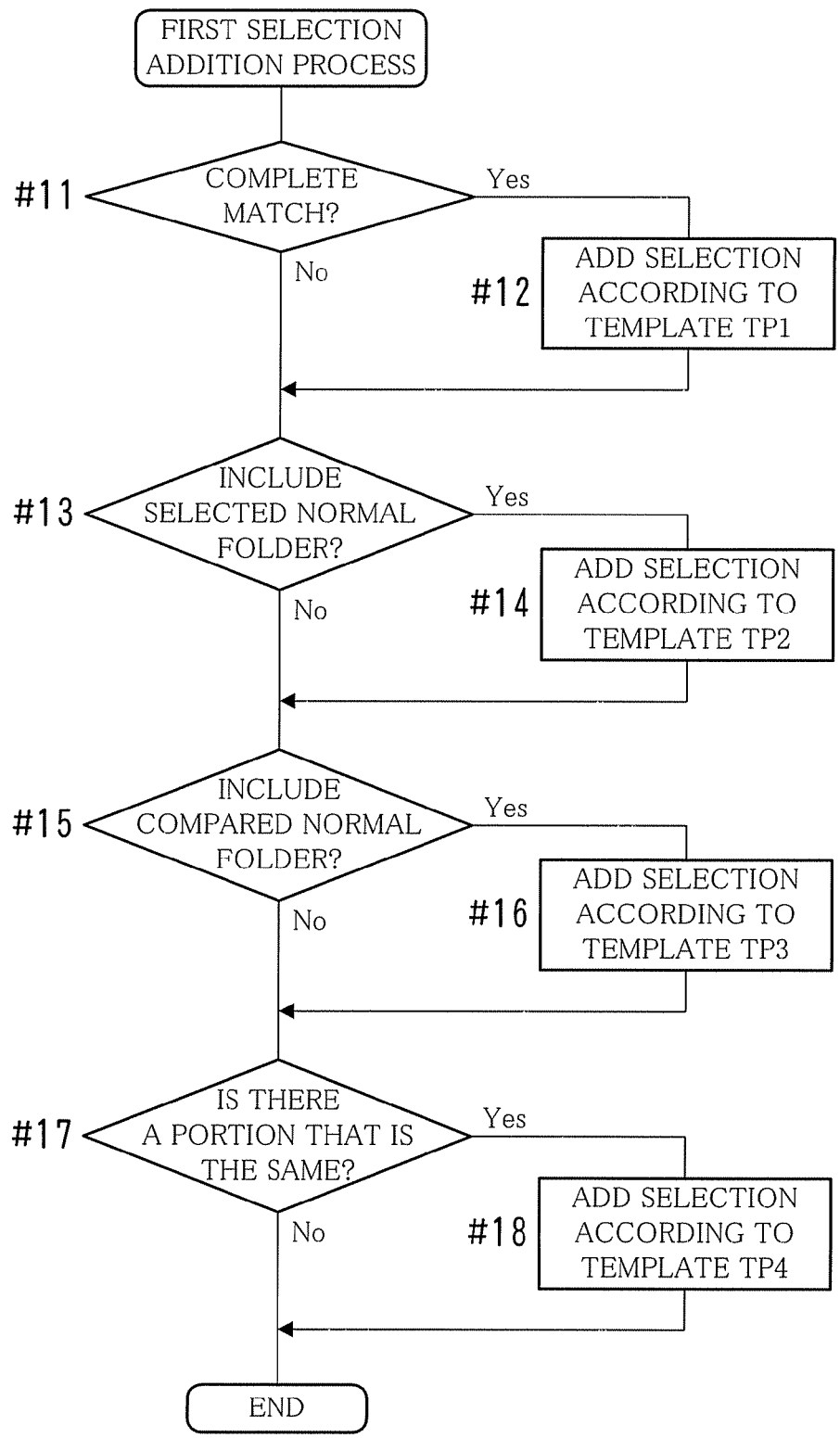
FIG. 8 is a flowchart for illustrating the flow of a first selection addition process.
Figure 10:
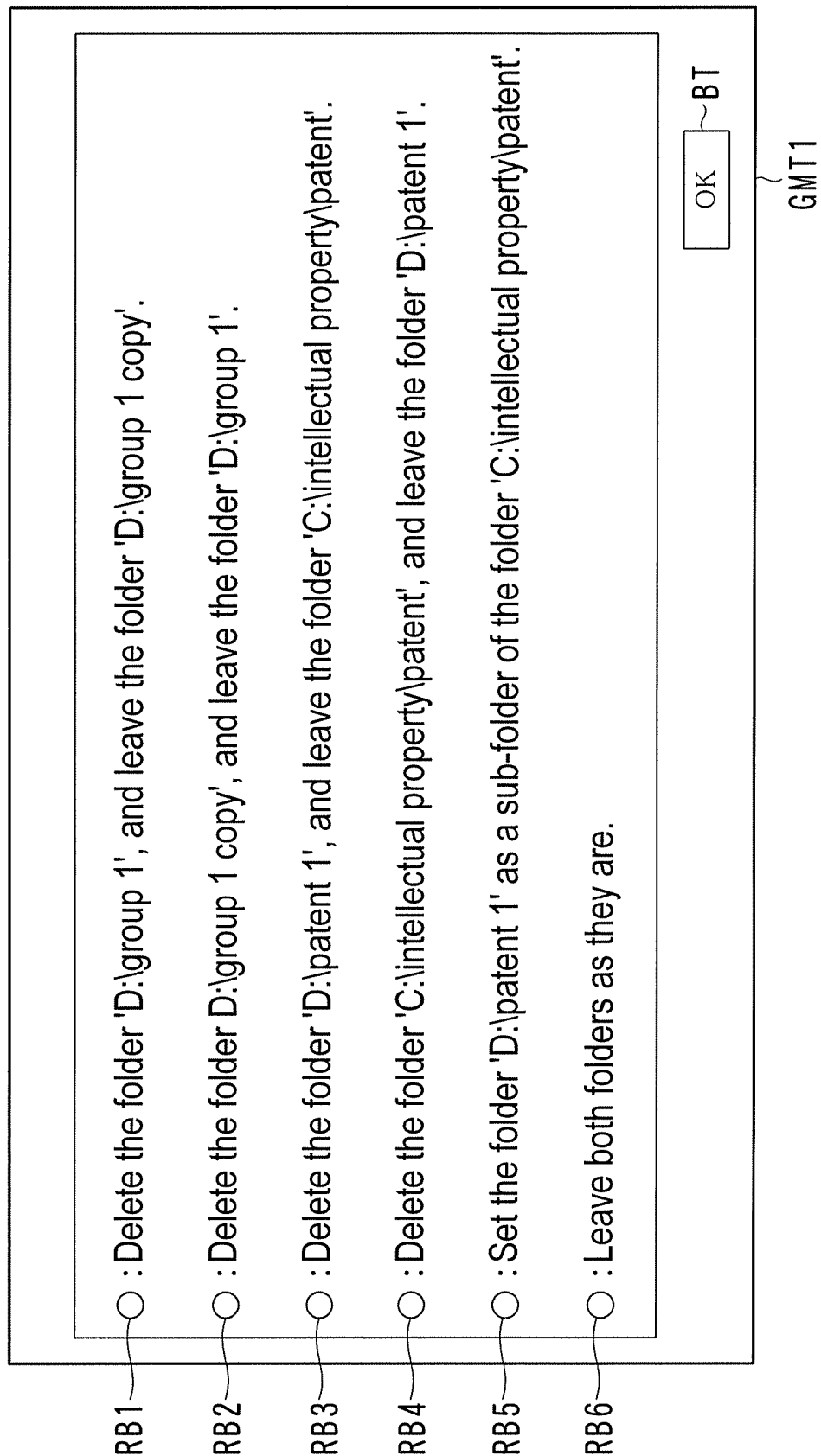
FIG. 10 shows an example of a selection presenting screen.

FIG. 6 shows an example of the configuration of the normal folder organization processing portion 106, FIGS. 7A to 7C show the relationship between sets Sa and Sb, FIG. 8 is a flowchart for illustrating the flow of a first selection addition process, FIGS. 9A to 9D show examples of a template TP of selections that are presented to a user, and FIG. 10 shows an example of a selection presenting screen GMT1.

As shown in FIG. 6, the normal folder organization processing portion 106 is configured from an identical/similar folder detection portion 61, a selection addition processing portion 62, a selection presenting screen display processing portion 63, an organization process execution portion 64, and the like, and executes a process that organizes normal folders that are saved to the managed storage medium of the file management system 1.

The identical/similar folder detection portion 61, by comparing a normal folder selected by the user to each of the other normal folders, searches in the normal folders that are saved to the managed storage medium of the file management system 1 for a normal folder whose constituent members are identical to those of the selected normal folder and a normal folder whose constituent members are similar to those of the selected normal folder. The contents of these normal folders are known by referring to the file information table TLD and the normal folder information table TLF.

In a case where a set including the files saved in one normal folder, the normal folder, and a search folder is 'Sa', and a set including the files saved in another normal folder, the normal folder, and a search folder is 'Sb', if Sa and Sb have a matching relationship with each other as shown in FIG. 7A, it is determined that these two normal folders are identical.

Specifically, both normal folders are determined to be identical in a case where all of the following requirements (A_1) to (A_5) are satisfied.

(A_1) When one or a plurality of files are saved in one of the normal folders, files identical to those files are all saved in the other normal folder as well, and files identical to the files saved in that other normal folder are all saved in the one normal folder as well. That is, the member configuration of the files of both normal folders match.

(A_2) When one or a plurality of search folders are saved in one of the normal folders, search folders identical to those search folders are all saved in the other normal folder as well, and search folders identical to the search folders saved in that other normal folder are all saved in the one normal folder as well. That is, the member configuration of the sub-search folders of both normal folders match.

(A_3) When a sub-search folder is furthermore saved in any search folder saved in one of the normal folders, that sub-search folder is identical to any sub-search folder that is saved in any search folder that is saved in the other normal folder. Likewise, also when a sub-search folder exists at a lower level, an identical search folder exists.

(A_4) When a sub-normal folder is saved in one of the normal folders, the member configuration of the file of this sub-normal folder and the search folder match the member configuration of the file of any sub-normal folder that is saved in the other normal folder and the search folder.

(A_5) When another sub-normal folder is further saved in any sub-normal folder that is saved in one of the normal folders, the member configuration of the file of this other sub-normal folder and the search folder match the member configuration of the file of any sub-normal folder that is saved in any sub-normal folder that is saved in the other normal folder and the search folder. Likewise, also when a sub-search folder exists at a lower level, the member configurations match each other.

Furthermore, a requirement that the folder names of the two normal folders (or sub-normal folders) that are compared are identical may be added to above (A_1) to (A_5).

A file that is saved in one of the normal folders (or sub-normal folders) is determined to be identical to a file that is saved in the other normal folder (or sub-normal folder) when all of the requirements of following (B_1) and (B_2) are satisfied.

(B_1) The file names of both files match.

(B_2) A content portion (data other than the portion related to attributes; so-called actual data) of both files matches.

Instead of the requirement of (B__2), any of the requirements of following (B__3), (B__4), or (B__5) may be used.

(B__3) The size of both files matches.

(B__4) The update time of both files matches.

(B__5) The size of both files matches and the update time of both files matches.

A search folder that is saved in one of the normal folders (or sub-normal folders) is determined to be identical to a search folder that is saved in the other normal folder (or sub-normal folder) when all of the requirements of following (C__1) to (C__3) are satisfied.

(C__1) The search conditions of both search folders are identical.

(C__2) When one of the search folders has one or a plurality of sub-search folders, the other search folder also has all of the sub-search folders with search conditions identical to those sub-search folders.

(C__3) When there is another sub-search folder in any sub-search folder of one of the search folders, the search conditions of this other sub-search folder are identical to the search conditions of any sub-search folder of any sub-search folder of the other search folder. Likewise, also when a sub-search folder exists at a lower level, the search conditions of sub-search folders at the corresponding level of both sub-search folders are identical.

For example, the search condition 'X1 and (X2 or X3)' and the search condition '(X1 and X2) or (X1 and X3)' differ from the perspective of character string, but are the same from the perspective of search condition expression. Thus, both search conditions are identical.

Also, in a case where the following requirements (D__1) or (D__2) are satisfied, both normal folders are determined to be similar.

(D__1) All of the files, search folders, and sub-normal folders that are identical to the files, search folders, and sub-normal folders that are saved in one of the normal folders are also saved in the other normal folder, but a file, search folder, or sub-normal folder that is not identical to a file, search folder, or sub-normal folder that is saved in that one normal folder is saved in the other normal folder. That is, where 'α' is a set of the files, search folders, and sub-normal folders that are saved in the one normal folder, and 'β' is a set of the files, search folders, and sub-normal folders that are saved in the other normal folder, as shown in FIG. 7B, α is a proper subset of β.

(D__2) Identical files, search folders, and sub-normal folders are saved in both the one normal folder and the other normal folder, but a file, search folder, or sub-normal folder that is not identical to a file, search folder, or sub-normal folder that is saved in that one normal folder is saved in the other normal folder, and a file, search folder, or sub-normal folder that is not identical to a file, search folder, or sub-normal folder that is saved in the other normal folder is saved in the one normal folder. That is, where 'α' is a set of the files, search folders, and normal folders that are saved in the one normal folder, 'β' is a set of the files, search folders, and normal folders that are saved in the other normal folder, and 'γ' is a set of the identical files, search folders, and normal folders that are saved in both the one normal folder and the other normal folder, as shown in FIG. 7C, γ is a proper subset of α, γ is a proper subset of β, γ is not a proper subset of β, and β is not a proper subset of α.

The following requirement (D__3) may be further added to the requirement (D__1) or (D__2).

(D__3) The file names of both normal folders are identical.

The following requirement (D__4) may be further added to the requirement (D__2).

(D__4) The ratio of the number of files in γ to the number of files in α is greater than a predetermined threshold value. Alternatively, the ratio of the number of files in γ to the number of files in β is greater than a predetermined threshold value.

Below, a normal folder that the user has selected is referred to as a 'selected normal folder', and a normal folder that is compared to the selected normal folder is referred to as a 'compared normal folder'.

Also, according to the process of the identical/similar folder detection portion 61, when the selected normal folder and the compared normal folder are similar, it is possible to obtain which state of similarity the two normal folders are in, from among a 'first similarity state' to a 'third similarity state', described below.

First similarity state: the selected normal folder and the compared normal folder satisfy above requirement (D__1), and the 'one normal folder' indicated in (D__1) is the selected normal folder and the 'other normal folder' is the compared normal folder.

Second similarity state: the selected normal folder and the compared normal folder satisfy above requirement (D__1), and the 'one normal folder' indicated in (D__1) is the compared normal folder and the 'other normal folder' is the selected normal folder.

Third similarity state: the selected normal folder and the compared normal folder satisfy above requirement (D__2).

When the identical/similar folder detection portion 61 finds a normal folder (compared normal folder) whose contents are identical or similar to the selected normal folder, the selection addition processing portion 62 generates selection data DS that indicates an organization process selection that can be obtained for both normal folders, and adds (saves) that selection data to the selection saving portion 102. The process of generating and adding the selection data DS is performed with a procedure like that shown in FIG. 8.

An administrator of the file management system 1 prepares data of a plurality of templates TP (TP1 to TP4) as shown in FIGS. 9A to 9D, and saves that data to a predetermined save location.

The selection addition processing portion 62 generates the selection data DS by applying the absolute path of the selected normal folder and the absolute path of the compared normal folder respectively to a 'selected folder path' portion and a 'compared folder path' portion that are underlined in FIGS. 9A to 9D.

In FIG. 8, when the compared normal folder matches (is identical to) the selected normal folder (Yes in #11), the selection addition processing portion 62 uses the template TP1 to generate the selection data DS, which indicates selections that the user is allowed to select, and saves the selection data DS to the selection saving portion 102 (#12).

That is, the selection addition processing portion 62 generates and adds selection data DS that, of the selected normal folder and the compared normal folder, indicates two selections: (a__1) delete the former and leave the latter, and (a__2) delete the latter and leave the former.

When the selected normal folder and the compared normal folder have the similarity of the above first similarity state (Yes in #13), selection data DS is generated using the template TP2, and added to the selection saving portion 102 (#14).

That is, the selection addition processing portion 62 generates and adds selection data DS that, of the selected normal folder and the compared normal folder, indicates four selections: (b__1) delete the former and leave the latter, (b__2)

delete the latter and leave the former, (b_3) set the former as a sub-normal folder of the latter, and (b_4) leave both as they are.

When the selected normal folder and the compared normal folder have the similarity of the above second similarity state (Yes in #15), selection data DS is generated using the template TP3, and added to the selection saving portion 102 (#16).

That is, the selection addition processing portion 62 generates and adds selection data DS that, of the selected normal folder and the compared normal folder, indicates four selections: (c_1) delete the latter and leave the former, (c_2) delete the former and leave the latter, (c_3) set the latter as a sub-normal folder of the former, and (c_4) leave both as they are.

When the selected normal folder and the compared normal folder have the similarity of the above third similarity state (Yes in #17), selection data DS is generated using the template TP4, and added to the selection saving portion 102 (#18).

That is, the selection addition processing portion 62 generates and adds selection data DS that, of the selected normal folder and the compared normal folder, indicates four selections: (d_1) delete the latter and leave the former, (d_2) delete the former and leave the latter, (d_3) combine both, and (d_4) leave both as they are.

When a plurality of compared normal folders that are identical or similar to the selected normal folder have been found, the process in FIG. 8 is executed on a folder-by-folder basis for the compared normal folders.

Returning to FIG. 6, the selection presenting screen display processing portion 63 displays a selection presenting screen GMT1 as in FIG. 10 in the display 17. In this selection presenting screen GMT1, selections indicated by the selection data DS saved in the selection saving portion 102, radio buttons RB (RB1, RB2, etc.) for selecting those selections, an OK button BT, and the like are arranged.

The organization process execution portion 64 executes a process that corresponds to a selection that has been selected by the user from within the selection presenting screen GMT1, according to the type of that selection, in the following manner.

When the user has selected any of the selection types (a_1), (b_1), (c_2), or (d_2), the organization process execution portion 64 performs a process of deleting the selected normal folder indicated in that selection. The compared normal folder indicated in that selection is left as it is.

When the user has selected any of the selection types (a_2), (b_2), (c_1), or (d_1), the organization process execution portion 64 performs a process of deleting the compared normal folder indicated in that selection. The selected normal folder indicated in that selection is left as it is.

When the user has selected the selection type (b_3), the organization process execution portion 64 deletes the selected normal folder indicated in that selection. Alternatively, after appropriately changing the folder name, the selected normal folder is moved immediately below the compared normal folder indicated in that selection.

When the user has selected the selection type (c_3), the organization process execution portion 64 deletes the compared normal folder indicated in that selection. Alternatively, after appropriately changing the folder name, the compared normal folder is moved immediately below the selected normal folder indicated in that selection.

When the user has selected the selection type (d_3), the organization process execution portion 64 combines the selected normal folder and the compared normal folder indicated in that selection. That is, where the set of the selected normal folder is '$\alpha+\gamma$' and the set of the compared normal folder is '$\beta+\gamma$', $\alpha$ is moved immediately below the compared normal folder, and the selected normal folder is deleted. Alternatively, $\beta$ is moved immediately below the selected normal folder, and the compared normal folder is deleted. Which process to perform may be determined in advance, or the user may be allowed to designate which process to perform. Also, a configuration may be adopted in which the moved normal folder is not deleted.

When the user has selected any of the selection types (b_4), (c_4), or (d_4), the organization process execution portion 64 does not perform an organization process. That is, both the selected normal folder and the compared normal folder that are indicated in that selection are left as they are.

Then, the organization process execution portion 64, according to whether the selected normal folder or the compared normal folder was deleted, one of those folders was moved as a sub-normal folder of the other, or a portion ($\alpha$ or $\beta$) of one of those folders was moved to the other, updates the normal folder information table TLF in FIG. 3, the file information table TLD in FIG. 4, and the search folder information table TLK in FIG. 5.

Figure 11:
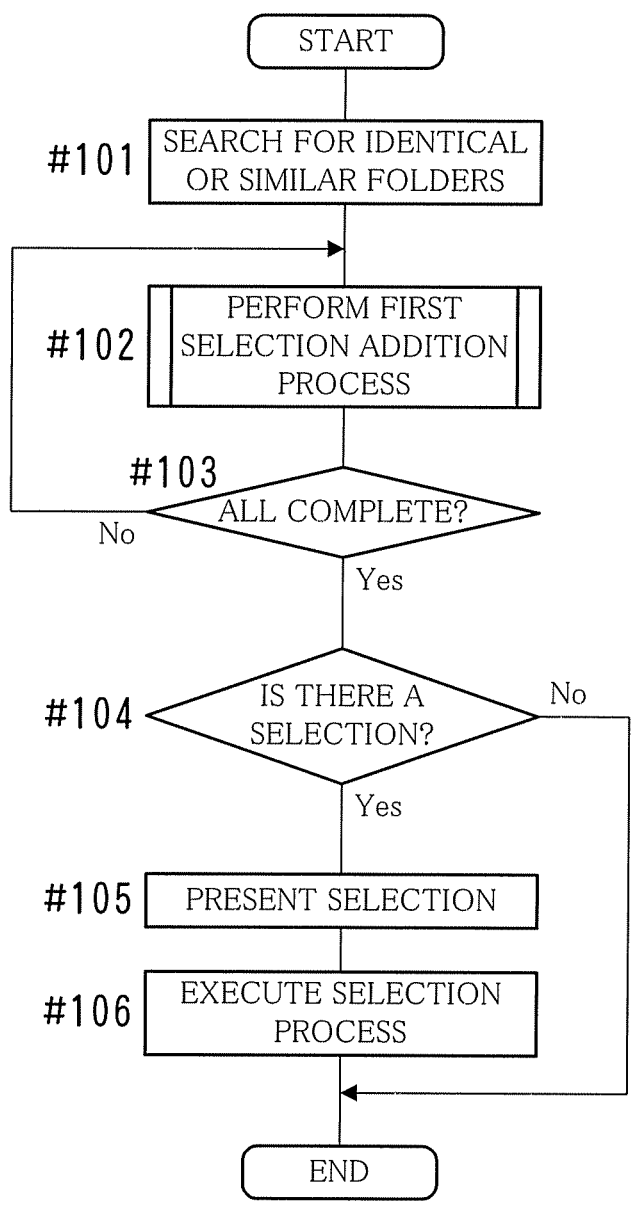
FIG. 11 is a flowchart for illustrating the overall flow of a normal folder organization process.

FIG. 11 is a flowchart for illustrating the overall flow of the normal folder organization process.

Following is a description of the overall procedure of the normal folder organization process in the file management system 1, with reference to the flowchart in FIG. 11.

In FIG. 11, when the user selects any normal folder that is saved to the managed storage medium of the file management system 1 and commands the file management system 1 to execute the normal folder organization process, the file management system 1 searches for a normal folder (compared normal folder) that is identical or similar to that normal folder (selected normal folder) (#101).

A process (the first selection addition process in FIG. 8) is performed in which selection data DS is added to the selection saving portion 102 for every combination of the selected normal folder and a compared normal folder that has been retrieved (#102 and No in #103).

In the process of Step #102, when there is an added selection, i.e., when there exists a compared normal folder that is identical or similar to the selected normal folder (Yes in #104), the selection presenting screen GMT1 (see FIG. 10) is displayed in the display 17 (#105). When the user chooses a selection from the selection presenting screen GMT1, and gives a command to execute the process indicated in that selection by pressing the OK button BT, the file management system 1 executes that process (#106). When there is not an added selection in the process of Step #102 (No in #104), the normal folder organization process is not performed.

According to the normal folder organization process described above, it is possible to suppress wasteful increase of normal folders in the file management system 1 by combining or deleting either one of normal folders that are identical or similar.

In the above example, a normal folder (compared normal folder) that is identical or similar to the normal folder (selected normal folder) selected by the user is retrieved, and an organization process is started for both normal folders when there is a user instruction, but when the number of normal folders that are saved to the managed storage medium has reached a predetermined number, identical and similar determination is performed for all combinations of normal folders that are saved, and the process of Step #102 in FIG. 11 is performed.

A configuration may be adopted in which, when the selected normal folder and the compared normal folder satisfy any of the following requirements (D_5) to (D_12), selection data DS is generated that indicates the selections (d_3) and (d_4) of the template TP4 shown in FIG. 9.

(D_5) When the number of types of files saved in one of the normal folders is no more than a predetermined number (for example, 1 or 2), all of the types of files saved in that one normal folder are identical to any type of file that is saved in the other normal folder, all of the types of files saved in the other normal folder are identical to any type of file that is saved in the one normal folder, and the one normal folder is not identical to the other normal folder. That is, the configuration of the types of files respectively saved in two normal folders that are not identical is identical.

(D_6) When the number of types of files saved in one of the normal folders is no more than a predetermined number, where '$\alpha$' is a set of the types of files that are saved in the one normal folder, and '$\beta$' is a set of the types of files that are saved in the other normal folder, $\alpha$ is a proper subset of $\beta$, and the one normal folder is not identical to the other normal folder. Alternatively, $\beta$ is a proper subset of $\alpha$, and the one normal folder is not identical to the other normal folder.

(D_7) When the number of types of files saved in one of the normal folders is no more than a predetermined number, where '$\alpha$' is a set of the types of files that are saved in the one normal folder, '$\beta$' is a set of the types of files that are saved in the other normal folder, and '$\gamma$' is a set of the types that are common to $\alpha$ and $\beta$, the ratio of the number in $\gamma$ to the number in $\alpha$ is at least a predetermined threshold value, and the one normal folder is not identical to the other normal folder. Alternatively, the ratio of the number in $\gamma$ to the number in $\beta$ is at least a predetermined threshold value, and the one normal folder is not identical to the other normal folder.

(D_8) When there is little variation in the update time (or creation time) of files that are saved in one of the normal folders, i.e., the update time (or creation time) of those files is within a predetermined period, the update time (or creation time) of files that are saved in the other normal folder is within that predetermined period, and the one normal folder is not identical to the other normal folder.

(D_9) When there is little variation in the update time (or creation time) of files that are saved in one of the normal folders, i.e., the update time (or creation time) of those files is within a predetermined period, the other normal folder has at least a predetermined number of files that are within that predetermined period, and the one normal folder is not identical to the other normal folder.

(D_10) When there is little variation in the creators of files that are saved in one of the normal folders, i.e., the number of creators of the files that are saved in the one normal folder is no more than a predetermined number, the creators of the files that are saved in the one normal folder are all identical to the creator of any file that is saved in the other normal folder, the creators of the files that are saved in the other normal folder are all identical to the creator of any file that is saved in the one normal folder, and the one normal folder is not identical to the other normal folder. That is, the configuration of the creators of files respectively saved in two normal folders that are not identical is identical.

(D_11) When the number of creators of the files that are saved in one of the normal folders is no more than a predetermined number, where '$\alpha$' is a set of the creators of files that are saved in the one normal folder, and '$\beta$' is a set of the creators of files that are saved in the other normal folder, $\alpha$ is a proper subset of $\beta$, and the one normal folder is not identical to the other normal folder. Alternatively, $\beta$ is a proper subset of $\alpha$, and the one normal folder is not identical to the other normal folder.

(D_12) When the number of creators of the files that are saved in one of the normal folders is no more than a predetermined number, where '$\alpha$' is a set of the creators of files that are saved in the one normal folder, '$\beta$' is a set of the creators of files that are saved in the other normal folder, and '$\gamma$' is a set of the creators that are common to $\alpha$ and $\beta$, the ratio of the number in $\gamma$ to the number in $\alpha$ is at least a predetermined threshold value, and the one normal folder is not identical to the other normal folder. Alternatively, the ratio of the number in $\gamma$ to the number in $\beta$ is at least a predetermined threshold value, and the one normal folder is not identical to the other normal folder.

[New Search Folder Generation Limiting Process and Existing Search Folder Organization Process]

Figure 13:
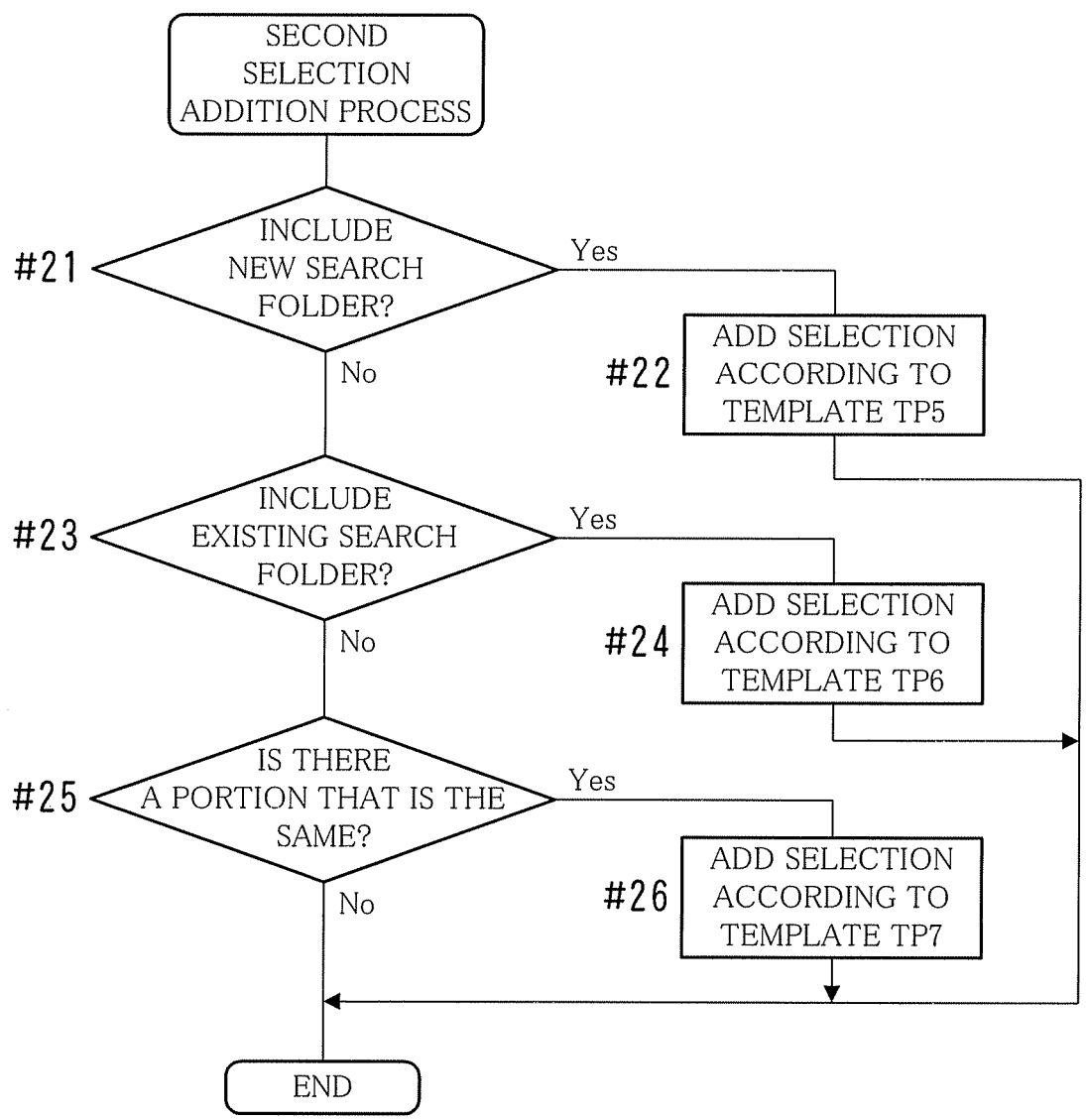
FIG. 13 is a flowchart for illustrating the flow of a second selection addition process.
Figure 17:
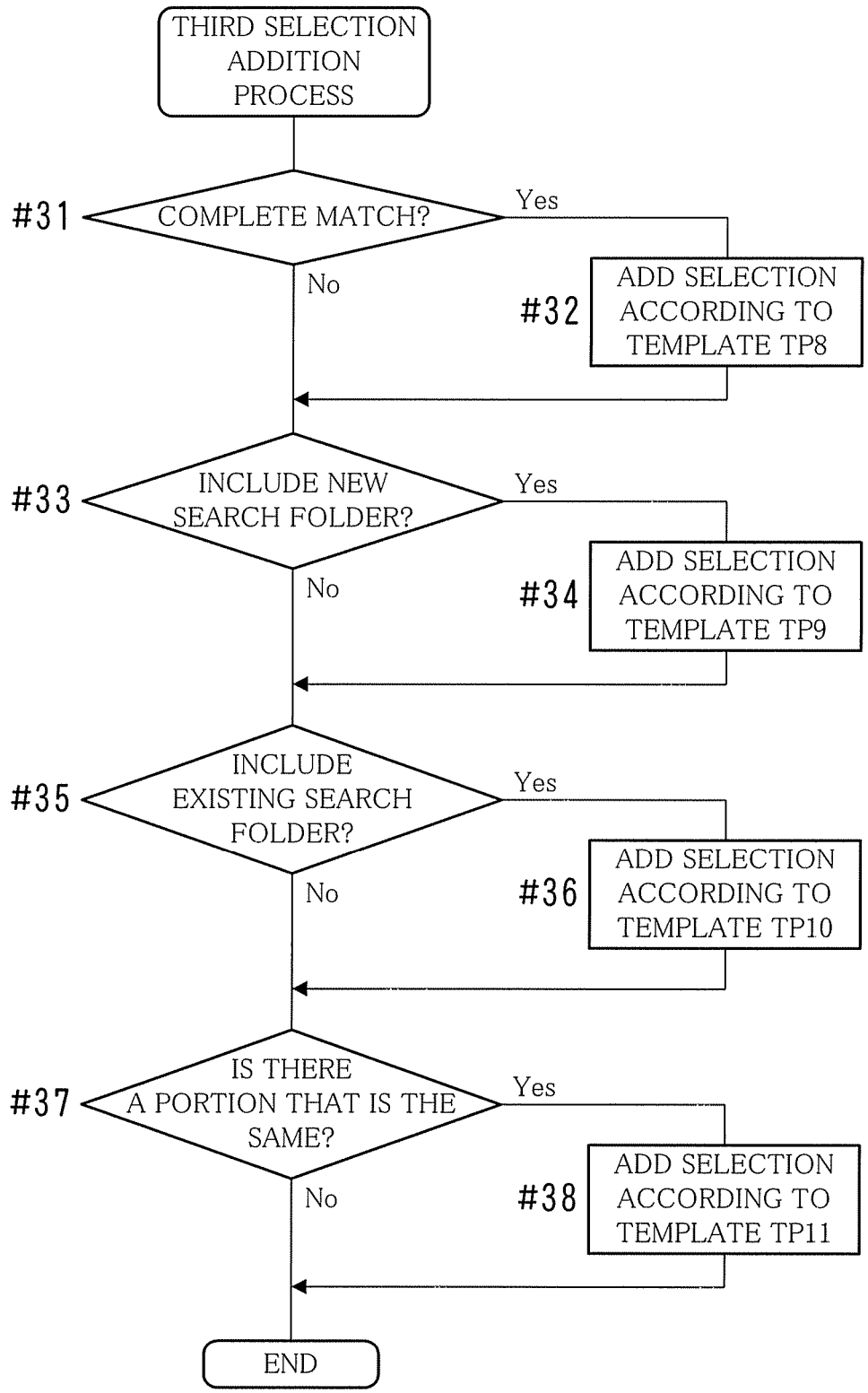
FIG. 17 is a flowchart for illustrating the flow of a third selection addition process.
Figure 20:
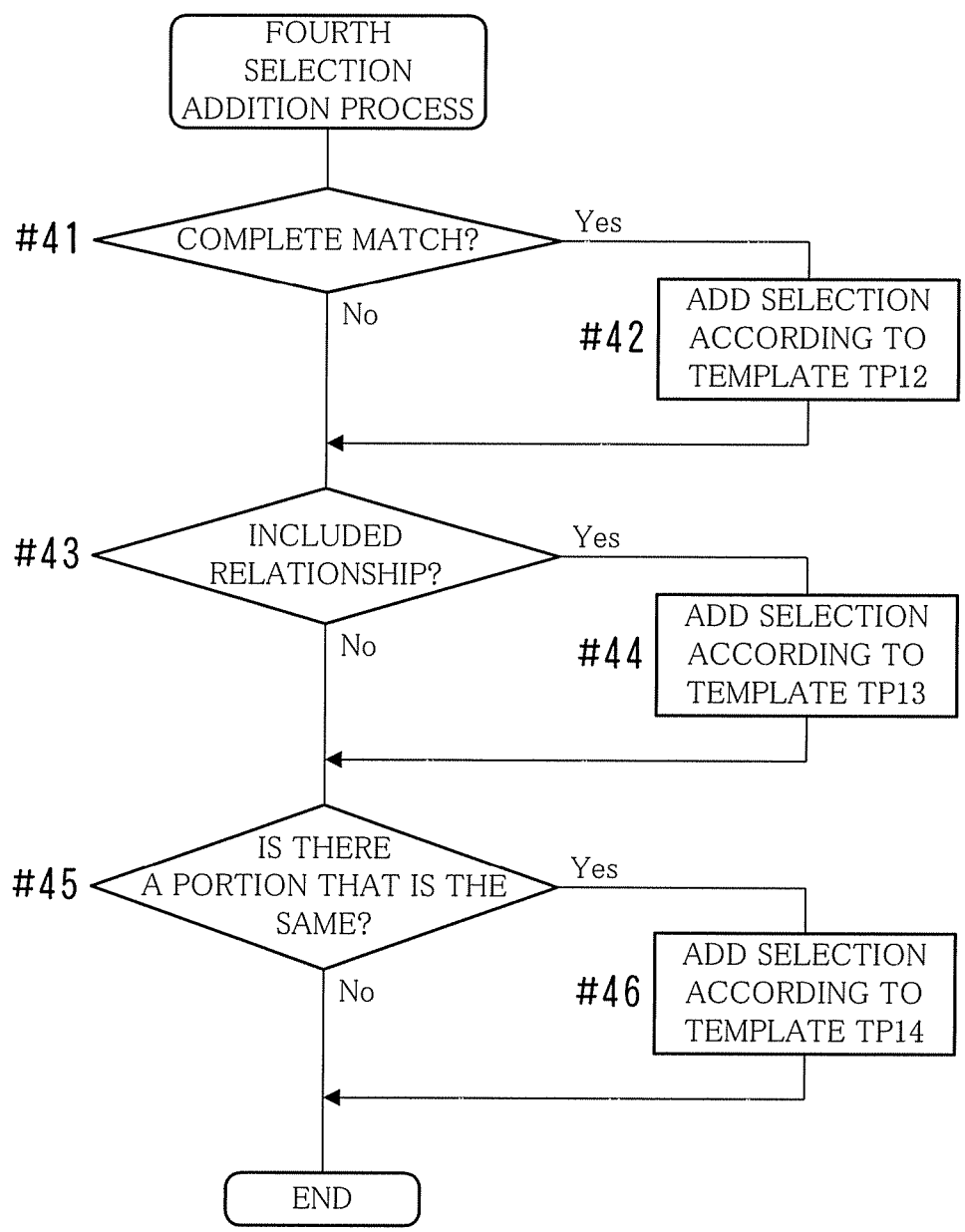
FIG. 20 is a flowchart for illustrating the flow of a fourth selection addition process.

FIG. 12 shows an example of the configuration of the search folder organization processing portion 105, FIG. 13 is a flowchart for illustrating the flow of a second selection addition process, FIGS. 14A to 14C show examples of a template of selections that are presented to a user, FIG. 15 shows an example of a selection presenting screen GMT2, FIG. 16 shows an example of a search result display screen GMK, FIG. 17 is a flowchart for illustrating the flow of a third selection addition process, FIGS. 18A to 18D show examples of a template of selections that are presented to a user, FIG. 19 shows an example of a selection presenting screen GMT3, FIG. 20 is a flowchart for illustrating the flow of a fourth selection addition process, FIGS. 21A to 21C show examples of a template of selections that are presented to a user, and FIG. 22 shows an example of a selection presenting screen GMT4.

As shown in FIG. 12, the search folder organization processing portion 105 is configured from an identical/similar search folder detection portion 71, an identical/similar search result folder detection portion 72, a new search folder generation allowable determining portion 73, a selection addition processing portion 74, a selection presenting screen display processing portion 75, an organization process execution portion 76, a search folder total counting portion 77, a second identical/similar search result folder detection portion 78, and the like, and mainly executes a process that limits saving of a new search folder to the managed storage medium, and a process that, when the number of search folders that are saved to the managed storage medium is at least a predetermined number, organizes those search folders.

The identical/similar search folder detection portion 71 detects (retrieves), from the managed storage medium, a search folder that is identical or similar to a search folder (referred to below as a 'new search folder') that the user attempted to newly create in the managed storage medium.

Two search folders are determined to be identical in a case where all of the above requirements (C_1) to (C_3) are satisfied.

Also, two search folders are determined to be similar in a case where either of the following requirements (E_1) and (E_2) are satisfied.

(E_1) The extent of the search conditions of one of the search folders is a proper subset of the extent of the search conditions of the other search folder. For example, the search conditions of the one search folder are 'X1 and X2 and X3', and the search conditions of the other search folder are 'X1 and X2'. Alternatively, the search conditions of the one search folder are 'X1 or X2' and the search conditions of the other search folder are 'X1 or X2 or X3'. Or, the search conditions of the one search folder are 'files with an update time of 2007 or later', and the search conditions of the other search folder are 'files with an update time of 2004 or later'. That is, where the extent of the search conditions of one of the search folders is 'α', and the extent of the search conditions of the other search folder is 'β', α and β have the relationship shown in FIG. 7B.

(E_2) Part of the extent of the search conditions of one of the search folders is the same as part of the extent of the search conditions of the other search folder, but the extent of the search conditions of the one search folder is not a proper subset of the extent of the search conditions of the other search folder, and the extent of the search conditions of the other search folder is not a proper subset of the extent of the search conditions of the one search folder. For example, the search conditions of the one search folder are 'X1 and X2', and the search conditions of the other search folder are 'X1 and X3'. That is, α and β have the relationship shown in FIG. 7C.

The following requirement (E_3) may be further added to the requirement (E_2).

(E_3) When the respective search conditions of both search folders are expressed by an AND operation of propositions of various attributes such as file name, update time, and size, the ratio of the number of propositions that match in both search conditions to the number of propositions of one search condition is greater than a predetermined threshold value. For example, when propositions of the search conditions of one search folder are QA1, QA2, QA3, and QA4 respectively for attributes ZA, ZB, ZC, and ZD, and the propositions of the search conditions of the other search folder are QB1, QB2, QB3, and QB4, and QB5 respectively for attributes ZA, ZB, ZC, ZD, and ZE, the search conditions of the one search folder are 'QA1 and QA2 and QA3 and QA4' and the search conditions of the other search folder are 'QB1 and QB2 and QB3 and QB4 and QB5', a check is performed of whether or not QA1 and QB1 match, whether or not QA2 and QB2 match, whether or not QA3 and QB3 match, and whether or not QA4 and QB4 match. When the ratio of the number of propositions that matched to the number (that is, '4') of propositions of the search conditions of the one search folder is greater than a predetermined threshold value, the search folders are determined to be similar to each other. Alternatively, when the ratio of the number of propositions that matched to the number (that is, '5') of propositions of the search conditions of the other search folder is greater than a predetermined threshold value, the search folders are determined to be similar to each other.

Also, according to the process of the identical/similar search folder detection portion 71, when a new search folder is similar to a search folder (also referred to below as an 'existing search folder' in order to distinguish from a new search folder) that is already saved to the managed storage medium, it is possible to obtain which state of similarity the two search folders are in, from among a 'fourth similarity state' to a 'sixth similarity state', described below.

Fourth similarity state: the new search folder and the existing search folder satisfy above requirement (E_1), and the 'one search folder' indicated in (E_1) is that new search folder and the 'other search folder' is that existing search folder.

Fifth similarity state: the new search folder and the existing search folder satisfy above requirement (E_1), and the 'one search folder' indicated in (EB_1) is that existing search folder and the 'other search folder' is that new search folder.

Sixth similarity state: the new search folder and the existing search folder satisfy above requirement (E_2).

The identical/similar search result folder detection portion 72 detects (retrieves), from the managed storage medium, an existing search folder that has search conditions that lead to search results that are identical to the results of a search (search results) based on the search conditions of the new search folder, or search conditions that lead to similar search results. Specifically, the search results of two search folders are determined to be identical in a case where the following requirement (F_1) is satisfied. (F_1) File and normal folder members that have been retrieved based on the search conditions of one of the search folders match file and normal folder members that have been retrieved based on the search conditions of the other search folder. That is, where a set of the files and normal folders of the search results of one of the search folders is 'Sa', and a set of the files and normal folders of the search results of the other search folder is 'Sb', Sa and Sb have the relationship shown in FIG. 7A.

Also, the search results of two search folders are determined to be similar in a case where any of the following requirements (G_1) to (G_3) are satisfied.

(G_1) All of the files and normal folders that are identical to the files and normal folders indicated in one search result are also indicated in the other search result, but a file or a normal folder that is not identical to any of the files and normal folders indicated in the one search result is indicated in the other search result. That is, where 'α' is a set of the files and normal folders that are indicated in the one search result, and 'β' is a set of the files and normal folders that are indicated in the other search result, as shown in FIG. 7B, a is a proper subset of β.

(G_2) Identical files and normal folders are indicated in both one of the search results and the other search result, but a file or a normal folder that is not identical to any of the files and normal folders indicated in the one search result is indicated in the other search result, and a file or a normal folder that is not identical to any of the files and normal folders indicated in the other search result is indicated in the one search result. That is, where 'α' is a set of the files and normal folders that are indicated in the one search result, 'β' is a set of the files and normal folders that are indicated in the other search result, and 'γ' is a set of the files and normal folders that are indicated in both the one search result and the other search result, as shown in FIG. 7C, β is a proper subset of α, γ is a proper subset of β, α is not a proper subset of β, and β is not a proper subset of α.

The following requirement (G_3) may be further added to the requirement (G_2).

(G-3) The ratio of the number of members (files and normal folders) in γ to the number of members in a is greater than a predetermined threshold value. Alternatively, the ratio of the number of members (files and normal folders) in γ to the number of members in β is greater than a predetermined threshold value.

Also, according to the process of the identical/similar search result folder detection portion 72, when a new search folder is similar to an existing search folder, it is possible to obtain which state of similarity the two search folders are in, from among a 'seventh similarity state' to a 'ninth similarity state', described below.

Seventh similarity state: the new search folder and the existing search folder satisfy above requirement (G_1), and the 'one search folder' indicated in (G_1) is that new search folder and the 'other search folder' is that existing search folder.

Eighth similarity state: the new search folder and the existing search folder satisfy above requirement (G_1), and the 'one search folder' indicated in (G_1) is that existing search folder and the 'other search folder' is that new search folder.

Ninth similarity state: the new search folder and the existing search folder satisfy above requirement (G_2).

Detection by the identical/similar search result folder detection portion 72 is performed in a case where a search folder identical or similar to the new search folder was not detected by the identical/similar search folder detection portion 71.

In the following manner, the new search folder generation allowable determining portion 73 determines whether or not creation (generation) of a new search folder that the user attempted to create is allowable, based on the results of processing by the identical/similar search folder detection portion 71. When the identical/similar search folder detection portion 71 has detected (retrieved) an existing search folder that is identical to the new search folder, creation of that new search folder is prohibited. When an identical existing search folder was not detected, creation of that new search folder is allowed.

When the identical/similar search folder detection portion 71 has detected (retrieved) a search folder that is similar to the new search folder, or when the identical/similar search result folder detection portion 72 has detected (retrieved) two search folders whose search results are identical or similar, the selection addition processing portion 74 generates selection data DT or DU that indicates an organization process selection that can be obtained for both search folders, and adds (saves) that selection data to the selection saving portion 102.

When the identical/similar search folder detection portion 71 has detected an existing search folder that is similar to the new search folder, the selection addition processing portion 74 generates selection data DT and saves that selection data DT to the selection saving portion 102, with the procedure shown in FIG. 13. Also, the selection addition processing portion 74 performs a process to generate selection data DW and save that selection data DW, described later.

An administrator of the file management system 1 prepares data of a plurality of templates TP (TP5 to TP7) as shown in FIGS. 14A to 14C, and saves that data to a predetermined save location.

The selection addition processing portion 74 generates the selection data DT by applying the search condition of the new search folder to 'new search condition', applying the search condition of the existing search folder to 'existing search condition', and applying the absolute path of the existing search folder to 'existing folder path', underlined in FIGS. 14A to 14C.

In FIG. 13, when the new search folder and the existing search folder have the similarity of the above fourth similarity state (Yes in #21), the selection addition processing portion 74 uses the template TP5 to generate the selection data DT, and adds the selection data DT to the selection saving portion 102 (#22). That is, selection data DT that indicates the following four selections is generated and added:

(e_1) Cancel creation of the former (new search folder) and a search thereby, and instead perform a search by the latter (found existing search folder).

(e_2) Create the former in the save location designated by the user, perform a search thereby, and delete the latter.

(e_3) Create the former as a sub-search folder of the latter, and perform a search by the former.

(e_4) Create the former in the save location designated by the user and perform a search thereby. Do not perform a special process related to the latter.

When the new search folder and the existing search folder have the similarity of the above fifth similarity state (Yes in #23), selection data DT is generated using the template TP6, and added to the selection saving portion 102 (#24). That is, selection data DT that indicates the following four selections is generated and added:

(f_1) Cancel creation of the former and a search thereby, and instead perform a search by the latter.

(f_2) Create the former in the save location designated by the user, perform a search thereby, and delete the latter.

(f_3) Create the former in the save location designated by the user, perform a search thereby, and change the latter to a sub-search folder of the former.

(f_4) Create the former in the save location designated by the user and perform a search thereby. Do not perform a special process related to the latter.

When the new search folder and the existing search folder have the similarity of the above sixth similarity state (Yes in #25), selection data DT is generated using the template TP7, and added to the selection saving portion 102 (#26). That is, selection data DT that indicates the following four selections is generated and added:

(g_1) Cancel creation of the former and a search thereby, and instead perform a search by the latter.

(g_2) Create the former in the save location designated by the user, perform a search thereby, and delete the latter.

(g_3) Update the latter such that the search condition of the former is added as an OR condition to the search condition of the latter. Perform a search by the latter after the latter is updated. Cancel creation of the former.

(g_4) Create the former in the save location designated by the user and perform a search thereby. Do not perform a special process related to the latter.

When a plurality of existing search folders have been detected, the process in FIG. 13 is executed on a folder-by-folder basis for the existing search folders.

The selection presenting screen display processing portion 75 displays a selection presenting screen GMT2 as in FIG. 15 in the display 17. In this selection presenting screen GMT2, selections indicated by the selection data DT saved in the selection saving portion 102, radio buttons RC (RC1, RC2, etc.) for selecting those selections, an OK button BTB, and the like are arranged. The selection presenting screen display processing portion 75 also performs a process that displays selection presenting screens GMT3 and GMT4, described later.

In the single quotation marks of the selections disposed in the selection presenting screens GMT2 to GMT4, search conditions are indicated, and the total number of files and normal folders that have been retrieved based on those search conditions is indicated in parentheses.

The organization process execution portion 76 and a search engine (search program) of the OS execute a process that corresponds to a selection that has been selected by the user from within the selection presenting screen GMT2, according to the type of that selection, in the following manner.

When the user has selected any of the selection types (e_1), (f_1), or (g_1), the organization process execution portion 76 cancels a process of generating (creating) the new search folder indicated in that selection. Also, the search engine performs a search with the search conditions of the existing folder indicated in that selection, and displays the results of that search in the display 17. The search results are displayed in a window like the search result display screen GMK shown in FIG. 16, for example.

When the user has selected any of the selection types (e__2), (f__2), or (g__2), the organization process execution portion 76 generates the new search folder indicated in that selection at the save location designated by the user, and deletes the existing search folder indicated in that selection. The search engine performs a search with the search conditions of that new search folder, and displays the results of that search in the display 17.

When the user has selected any of the selection types (e__4), (f__4), or (g__4), the organization process execution portion 76 generates the new search folder indicated in that selection at the save location designated by the user. The search engine performs a search with the search conditions of that new search folder, and displays the results of that search in the display 17.

When the user has selected the selection type (e__3), the organization process execution portion 76 generates the new search folder indicated in that selection immediately below the existing search folder indicated in that selection. The search engine performs a search with the search conditions of that new search folder, and displays the results of that search in the display 17.

When the user has selected the selection type (f__3), the organization process execution portion 76 generates the new search folder indicated in that selection at the save location designated by the user, and changes the existing search folder indicated in that selection to a sub-search folder of that new search folder. The search engine performs a search with the search conditions of that new search folder, and displays the results of that search in the display 17.

When the user has selected the selection type (g__3), the organization process execution portion 76 updates the existing search folder indicated in that selection such that the search condition of the new search folder indicated in that selection is added as an OR condition to the search condition of that existing search folder. The search engine performs a search with the search condition of the updated existing search folder, and displays the results of that search in the display 17.

When the identical/similar search folder detection portion 71 has detected no existing search folder that is identical or similar to the new search folder, no selection data DT is saved in the selection saving portion 102. In this case, the process of the organization process execution portion 76 is not executed. Then, the OS generates that new search folder, the search engine executes a search with the search conditions of the new search folder, and the results of that search are displayed in the display 17.

When an existing search folder with search conditions whose search results are identical or similar to search results based on the search conditions of the new search folder is found by the identical/similar search result folder detection portion 72, the selection addition processing portion 74 generates selection data DU and saves that selection data DU to the selection saving portion 102, with the procedure shown in FIG. 17.

An administrator of the file management system 1 prepares data of a plurality of templates TP (TP8 to TP11) as shown in FIGS. 18A to 18D, and saves that data to a predetermined save location.

The selection addition processing portion 74 generates the selection data DU by applying the search condition of the new search folder to 'new search condition', applying the search condition of the existing search folder to 'existing search condition', and applying the absolute path of the existing search folder to 'existing folder path', underlined in FIGS. 18A to 18D.

In FIG. 17, when the search results of the new search folder and the search results of the existing search folder are identical (Yes in #31), the selection addition processing portion 74 uses the template TP8 to generate the selection data DU, and saves the selection data DU to the selection saving portion 102 (#32). That is, selection data DU that indicates the following two selections is generated and added:

(h__1) Do not create the former (that new search folder), and do not perform a special process related to the latter (that existing search folder).

(h__2) Create the former in the save location designated by the user. Do not perform a special process related to the latter.

When the new search folder and the existing search folder have the similarity of the above seventh similarity state (Yes in #33), selection data DU is generated using the template TP9, and added to the selection saving portion 102 (#34). That is, selection data DU that indicates the following four selections is generated and added:

(i__1) Do not create the former, and do not perform a special process related to the latter.

(i__2) Create the former in the save location designated by the user, and delete the latter.

(i__3) Create the former as a sub-search folder of the latter.

(i__4) Create the former in the save location designated by the user. Do not perform a special process related to the latter.

When the new search folder and the existing search folder have the similarity of the above eighth similarity state (Yes in #35), selection data DU is generated using the template TP10, and added to the selection saving portion 102 (#36). That is, selection data DU that indicates the following four selections is generated and added:

(j__1) Do not create the former, and do not perform a special process related to the latter.

(j__2) Create the former in the save location designated by the user, and delete the latter.

(j__3) Create the former in the save location designated by the user, and change the latter to a sub-search folder of the former.

(j__4) Create the former in the save location designated by the user. Do not perform a special process related to the latter.

When the new search folder and the existing search folder have the similarity of the above ninth similarity state (Yes in #37), selection data DU is generated using the template TP11, and added to the selection saving portion 102 (#38). That is, selection data DU that indicates the following four selections is generated and added:

(k__1) Do not create the former, and do not perform a special process related to the latter.

(k__2) Create the former in the save location designated by the user, and delete the latter.

(k__3) Update the latter such that the search condition of the former is added as an OR condition to the search condition of the latter. Cancel creation of the former.

(k__4) Create the former in the save location designated by the user. Do not perform a special process related to the latter.

When a plurality of existing search folders have been detected, the process in FIG. 17 is executed on a folder-by-folder basis for the existing search folders.

The selection presenting screen display processing portion 75 displays a selection presenting screen GMT3 as in FIG. 19 in the display 17. In this selection presenting screen GMT3, selections indicated by the selection data DU saved in the selection saving portion 102, radio buttons RD (RD1, RD2, etc.) for selecting those selections, an OK button BTC, and the like are arranged.

The organization process execution portion 76 executes a process that corresponds to a selection that has been selected by the user from within the selection presenting screen GMT3, according to the type of that selection, in the following manner.

When the user has selected any of the selection types (h__1), (i__1), (j__1), or (k__1), the organization process execution portion 76 cancels a process of generating (creating) the new search folder indicated in that selection.

When the user has selected any of the selection types (i__2), (j__2), or (k__2), the organization process execution portion 76 generates the new search folder indicated in that selection at the save location designated by the user, and deletes the existing search folder indicated in that selection.

When the user has selected any of the selection types (h__2), (i__4), (j__4), or (k__4), the organization process execution portion 76 generates the new search folder indicated in that selection at the save location designated by the user.

When the user has selected the selection type (i__3), the organization process execution portion 76 generates the new search folder indicated in that selection immediately below the existing search folder indicated in that selection.

When the user has selected the selection type (j__3), the organization process execution portion 76 generates the new search folder indicated in that selection at the save location designated by the user, and changes the existing search folder indicated in that selection to a sub-search folder of that new search folder.

When the user has selected the selection type (k__3), the organization process execution portion 76 updates the existing search folder indicated in that selection such that the search condition of the new search folder indicated in that selection is added as an OR condition to the search condition of that existing search folder.

When the total number of search folders of the managed storage medium is at least a predetermined number, the second identical/similar search result folder detection portion 78 detects (retrieves), from among those search folders, two search folders whose results of searches (search results) of files and normal folders performed based on the respective search conditions are identical or similar. The total number of search folders is counted (totaled) by the search folder total counting portion 77.

The search results of two search folders are determined to be identical in a case where the above requirement (F__1) is satisfied. Also, the search results of two search folders are determined to be similar in a case where any of the above requirements (G__1) and (G__2) are satisfied. Here, one of the two search folders that have been retrieved is referred to as a 'first search folder', and the other is referred to as a 'second search folder'.

Also, according to the process of the second identical/similar search result folder detection portion 78, it is possible to obtain which state of similarity the first search folder and the second search folder have, from among a 'tenth similarity state' and an 'eleventh similarity state', described below.

Tenth similarity state: the two search folders satisfy above requirement (G__1).

Eleventh similarity state: the two search folders satisfy above requirement (G__2).

The selection addition processing portion 74 generates selection data DW and saves that selection data DW to the selection saving portion 102, with the procedure shown in FIG. 20.

An administrator of the file management system 1 prepares data of a plurality of templates TP (TP12 to TP14) as shown in FIGS. 21A to 21C, and saves that data to a predetermined save location.

The selection addition processing portion 74 generates the selection data DW by applying the search conditions of the first search folder to 'first search condition', applying the absolute path of the first search folder to 'first path', applying the search conditions of the second search folder to 'second search condition', and applying the absolute path of the second search folder to 'second path', underlined in FIGS. 21A to 21C.

In FIG. 20, when the search results of the first search folder and the search results of the second search folder are identical (Yes in #41), the selection addition processing portion 74 uses the template TP12 to generate the selection data DW, and saves the selection data DW to the selection saving portion 102 (#42). That is, selection data DW that indicates the following three selections is generated and added:

(l__1) Delete the former (the first search folder), and do not perform a special process related to the latter (the second search folder).

(l__2) Delete the latter, and do not perform a special process related to the former.

(l__3) Do not perform a special process related to the former or the latter.

When the first search folder and the second search folder have the similarity of the above tenth similarity state (Yes in #43), selection data DW is generated using the template TP13, and added to the selection saving portion 102 (#44). That is, selection data DW that indicates the following five selections is generated and added:

(m__1) Delete the former, and do not perform a special process related to the latter.

(m__2) Delete the latter, and do not perform a special process related to the former.

(m__3) Change the former to a sub-search folder of the latter.

(m__4) Change the latter to a sub-search folder of the former.

(m__5) Do not perform a special process related to the former or the latter.

When the first search folder and the second search folder have the similarity of the above eleventh similarity state (Yes in #45), selection data DW is generated using the template TP14, and added to the selection saving portion 102 (#46). That is, selection data DW that indicates the following five selections is generated and added:

(n__1) Delete the former, and do not perform a special process related to the latter.

(n__2) Delete the latter, and do not perform a special process related to the former.

(n__3) Update the latter such that the search condition of the former is added as an OR condition to the search condition of the latter. Delete the former.

(n__4) Update the former such that the search condition of the latter is added as an OR condition to the search condition of the former. Delete the latter.

(n__5) Do not perform a special process related to the former or the latter.

When a plurality of combinations have been detected, the process in FIG. 20 is executed on a combination-by-combination basis for these combinations.

The selection presenting screen display processing portion 75 displays a selection presenting screen GMT4 as in FIG. 22 in the display 17. In this selection presenting screen GMT4, selections indicated by the selection data DW saved in the selection saving portion 102, radio buttons RE (RE1, RE2, etc.) for selecting those selections, an OK button BTD, and the like are arranged.

The organization process execution portion 76 executes a process that corresponds to a selection that has been selected by the user from within the selection presenting screen GMT4, according to the type of that selection, in the following manner.

When the user has selected any of the selection types (l_1), (m_1), or (n_1), the organization process execution portion 76 deletes the first search folder indicated in that selection.

When the user has selected any of the selection types (l_2), (m_2), or (n_2), the organization process execution portion 76 deletes the second search folder indicated in that selection.

When the user has selected any of the selection types (l_3), (m_5), or (n_5), the organization process execution portion 76 does not perform a special process.

When the user has selected the selection type (m_3), the organization process execution portion 76 changes the first search folder indicated in that selection to a sub-search folder of the second search folder indicated in that selection.

When the user has selected the selection type (m_4), the organization process execution portion 76 changes the second search folder indicated in that selection to a sub-search folder of the first search folder indicated in that selection.

When the user has selected the selection type (n_3), the organization process execution portion 76 updates the second search folder indicated in that selection such that the search condition of the first search folder indicated in that selection is added as an OR condition to the search condition of the second search folder. The first search folder is deleted.

When the user has selected the selection type (n_4), the organization process execution portion 76 updates the first search folder indicated in that selection such that the search condition of the second search folder indicated in that selection is added as an OR condition to the search condition of the first search folder. The second search folder is deleted.

Figure 23:
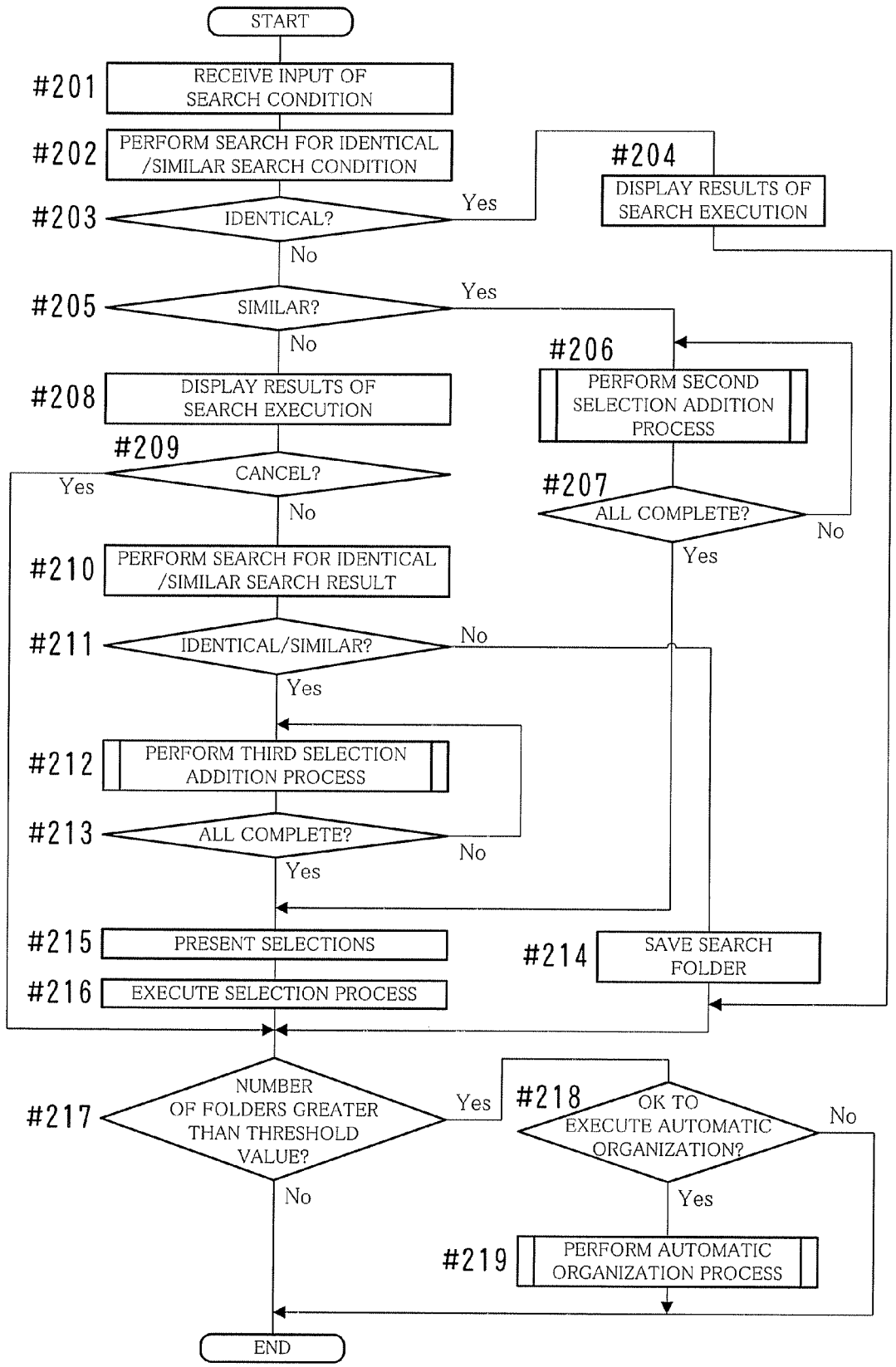
FIG. 23 is a flowchart for illustrating the overall flow of a new search folder generation limiting process and an existing search folder organization process.
Figure 24:
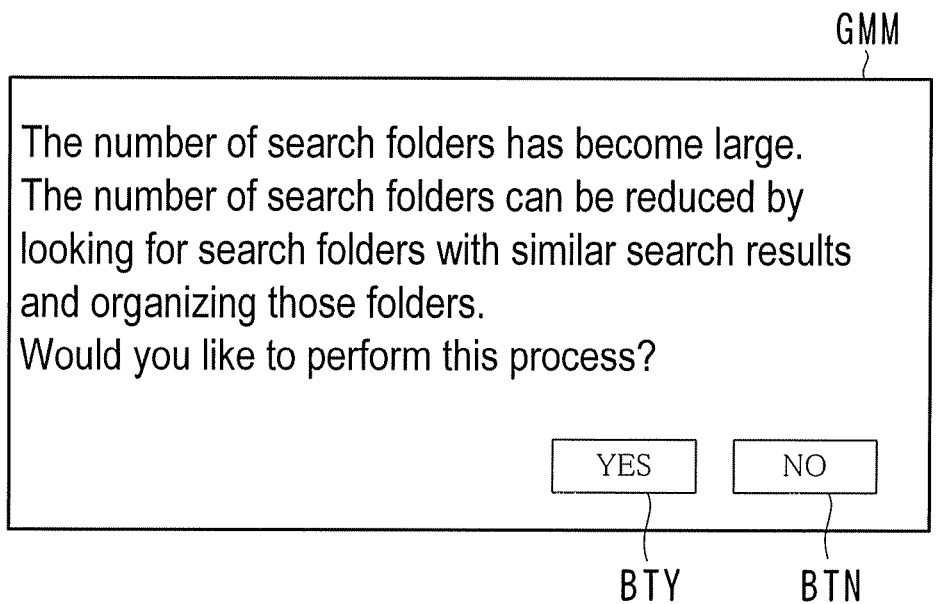
FIG. 24 shows an example of a confirmation screen.
Figure 25:
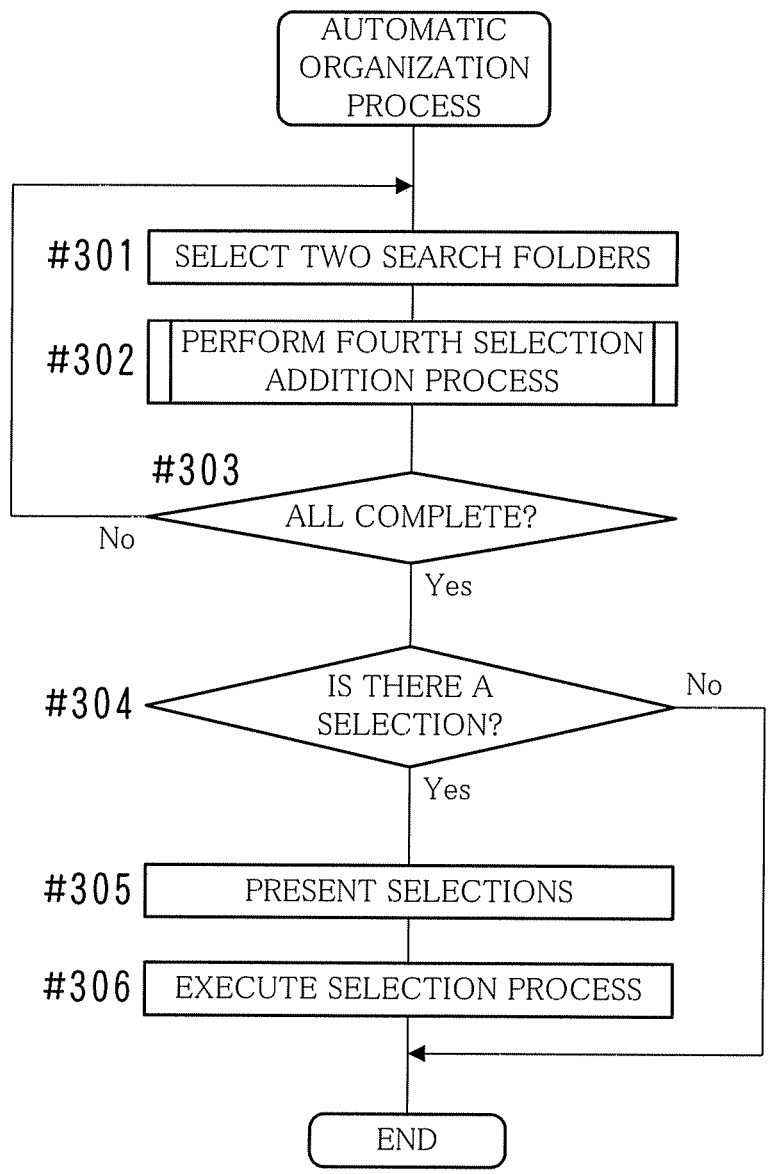
FIG. 25 is a flowchart for illustrating the flow of an automatic organization process.

FIG. 23 is a flowchart for illustrating the overall flow of a new search folder generation limiting process and an existing search folder organization process, FIG. 24 shows an example of a confirmation screen GMM, and FIG. 25 is a flowchart for illustrating the flow of an automatic organization process.

Next is a description of the overall flow of the new search folder generation limiting process and the existing search folder organization process, with reference to the flowchart in FIG. 23.

In FIG. 23, when the user inputs search conditions for searching files or folders and commands the file management system 1 to create (generate) a new search folder having those search conditions (#201), the file management system 1 detects existing search folders that are identical or similar to that new search folder (#202).

When an identical existing search folder has been detected (Yes in #203), a search is performed based on the search conditions of that existing search folder, and the results of that search are displayed in the display 17 (#204). Then, the processing of Step #217 onward is performed. Generation of that new search folder is canceled.

When an identical existing search folder has not been detected (No in #203), and a similar existing search folder has been detected (Yes in #205), the second selection addition process illustrated in FIG. 13 is performed for the similar existing search folder and new search folder (#206). When a plurality of similar existing search folders have been detected, the second selection addition process is performed for all of those detected folders (No in #207).

When neither an identical existing search folder nor a similar existing search folder has been detected (No in #203 and No in #205), a search is executed based on the search conditions that have been input by the user, and a search result display screen GMK (see FIG. 16) that indicates the results of that search is displayed in the display 17 (#208).

The user views those search results, and determines whether or not to save a new search folder with those results. When generation of that new search folder is cancelled (Yes in #209), the processing from Step #217 onward is performed.

When the user did not cancel generation of the new search folder (Yes in #209), the file management system 1 performs a process for organizing search folders, based on the identicalness and similarity of the search results (#210 to #216).

That is, from among the existing search folders, existing search folders are detected (retrieved) that have search conditions that lead to search results that are identical to search results based on the search conditions of the new search folder, or search conditions that lead to similar search results (#210).

When neither an existing search folder whose search results are identical nor an existing search folder whose search results are similar has been detected (No in #211), the organization process based on identicalness and similarity of search results is canceled. Then, the new search folder is generated at the save location designated by the user (#214). Then, the processing of Step #217 onward is performed.

When an existing search folder with search conditions whose search results are identical or similar is detected (Yes in #211), the third selection addition process illustrated in FIG. 17 is performed for that existing search folder (#212). When a plurality of such existing search folders have been detected, the third selection addition process is performed for all of those detected folders (No in #213).

A screen (the selection presenting screen GMT2 as shown in FIG. 15 or the selection presenting screen GMT3 as shown in FIG. 19) that presents the selections that have been added by the second selection addition process or the third selection addition process to the user is displayed in the display 17 (#215). In the selection presenting screen GMT2 or GMT3, when the user selects a selection and commands the file management system 1 to execute the process indicated in that selection, the file management system 1 executes that process (#216).

Further, the file management system 1 checks whether or not the total number of search folders that are saved to the managed storage medium is greater than a predetermined threshold value. If not greater than the predetermined threshold value (No in #217), then the process is ended.

When the total number of search folders that are saved to the managed storage medium is greater than the predetermined threshold value (Yes in #217), a confirmation screen GMM such as that shown in FIG. 24 for the user to confirm whether or not to perform the existing search folder organization process is displayed in the display 17.

When the user presses a no button BTN in the confirmation screen GMM (No in #218), the process is ended. When the user presses a yes button BTY (Yes in #218), the automatic organization process is executed with the procedure shown in FIG. 25 (#219).

In FIG. 25, two desired search folders that are saved to the managed storage medium are selected, and a search is performed based on the search condition of each search folder (#301). Based on whether or not those search results are identical to each other, and whether or not they are similar to each other, the fourth selection addition process illustrated in FIG. 20 is performed for that existing search folder (#302). The process of Steps #301 and #302 is repeated for all combinations of the saved search folders (No in #303).

After processing is finished for all combinations (Yes in #303), if there is a selection that has been added in the fourth selection addition process (Yes in #304), a selection presenting screen GMT as shown in FIG. 24 is displayed in the display 17 (#305). Then, the process of the selection that the user selected in the selection presenting screen GMT is executed (#306). If there is not a selection that has been added in the fourth selection addition process (No in #304), then the automatic organization process is cancelled.

According to the present embodiment, it is possible to organize search folders that are saved to the managed storage medium by combining search folders that are identical or similar to each other, and deleting either one of those search folders or changing one of those search folders to a sub-search folder of the other search folder. Also, it is possible to prevent wasteful creation of multiple search folders that are identical or similar, so wasteful increase of search folders is suppressed, and therefore the user can easily see an objective search folder.

In the present embodiment, when the number of search folders saved to the managed storage medium is greater than a predetermined number, the automatic organization process is executed, but this process may also be executed when there is an instruction from the user, without the number of search folders saved to the managed storage medium being greater than the predetermined number. Alternatively, this process may be executed when the file management system 1 is in an idle state. In such a case, when the idle state is released by input from the user, the selection presenting screen display processing portion 75 displays selections that have been added in the display 17. When the user selects a process from a selection to instruct execution of that process, the organization process execution portion 76 and the search engine of the OS execute that process.

In the present embodiment, the file management system 1 is configured from only a personal computer, i.e., has a stand-alone configuration, but the file management system 1 may also be configured from a server that performs file management and one or a plurality of terminal devices, i.e., may have a client-server configuration. In such a case, the server is connected to each terminal device via communications lines of, for example, a LAN, a WAN, or the Internet. Then, that server executes the normal folder and search folder organization processes described in this embodiment, according to search condition instructions and new search folder generation commands from any of the terminal devices.

In the present embodiment, a new search folder is not created in selection (g_3) of the template TP7 shown in FIG. 14C, but in this selection a new search folder may be created. Also, in this embodiment the search condition of an existing search folder is updated by adding the search condition of that new search folder to the search condition of the existing search folder as an OR condition, but a configuration may also be adopted in which the search condition of the existing search folder is not updated, and a search folder with a search condition in which the search condition of the new search folder has been added as an OR condition to the search condition of the existing search folder is newly created separately. Alternatively, a new search folder may be created, and the search condition of the existing search folder added to the search condition of that new search folder as an OR condition. In this case, the existing search folder may be deleted, or may be left remaining.

In the present embodiment, a new search folder is not created in selection (k_3) of the template TP11 shown in FIG. 18D, but in this selection a new search folder may be created. Also, in this embodiment the search condition of an existing search folder is updated by adding the search condition of that new search folder to the search condition of the existing search folder as an OR condition, but a configuration may also be adopted in which the search condition of the existing search folder is not updated, and a search folder with a search condition in which the search condition of the new search folder has been added as an OR condition to the search condition of the existing search folder is newly created separately. Alternatively, a new search folder may be created, and the search condition of the existing search folder added to the search condition of that new search folder as an OR condition. In this case, the existing search folder may be deleted, or may be left remaining.

In the present embodiment, one of the search folders is deleted in selections (n_3) and (n_4) of the template TP14 shown in FIG. 21C, but a configuration may also be adopted in which this search folder is not deleted. Also, in this embodiment, by adding the search condition of one of the new search folders as an OR condition to the search condition of the other search folder, the search condition of the other search folder is updated, but a configuration may also be adopted in which the search condition of the other search folder is not updated, and a search folder with a search condition in which the search condition of the one search folder has been added as an OR condition to the search condition of the other search folder is newly created separately. In this case, one or both of the one search folder and the other search folder may be deleted, or may be left remaining.

In the present embodiment, the identical/similar search folder detection portion 71, when determining whether or not two search folders are similar, compares the search condition format of both search folders, and determines whether or not the two search folders are similar based on whether or not the ratio of the number of propositions that match in both search conditions to the number of propositions of one search condition is greater than a predetermined threshold value. In this case, a weighted value (weighted score) may be given to the individual propositions, and the determination made based on the total of the weighted scores. For example, a weighted score with a larger value is given to a proposition with a longer character string. A total of the weighted scores of the propositions that match in both search conditions is obtained, and the search folders are determined to be similar to each other when the ratio of that total to the total of the weighted scores of the propositions of one of the search conditions is greater than a predetermined threshold value. Alternatively, a weighted score with a larger value may be given to a proposition that is used more often (a high-frequency proposition), i.e., a proposition that is frequently used in searches. In this case, each proposition that has been used in a search in the past is saved associated with the number of times that each proposition has been used.

A configuration may be adopted in which, when comparing the search results of two search folders, a search for obtaining those search results is not executed every time such a comparison is performed, but rather, the results of a previously performed search are stored for each search folder, and the comparison is performed using those search results. That is, the search results are compared using the results of the most recently performed search. In this way, it is possible to omit a search process, thus increasing the speed of processing.

Also, the search folder function is realized by a function of the OS or software such as a mailer.

In the present embodiment, the user is allowed to select the search folder organization process and the normal folder organization process, but a predetermined organization process may be executed.

In the present embodiment, the organization process was performed with a normal folder selected by the user and another normal folder identical or similar to the selected normal folder as subjects of that process, but a configuration may also be adopted in which, periodically or according to a user command, two normal folders that are identical or similar to each other are optionally detected, and the organization process is performed with those two normal folders as the subjects of that process.

Furthermore, the configuration or function of all or any portion of the file management system 1, the configuration and content of tables, the configuration and content of screens, the content indicated by pieces of data, the content or order of processing, or the like can be appropriately modified according to the gist of the invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A data management device comprising:
a search condition information nontransitory storage medium storing one or more pieces of search condition information, each piece of the search condition information indicating a search condition;
a data retrieval portion retrieving, from a storage medium, when a piece of the search condition information is designated, data satisfying the search condition indicated in the piece of the search condition information;
a similar search condition information detector detecting as the search condition, when a new search condition is designated by a user, a piece of the search condition information indicating a similar search condition that is similar to the new search condition; and
an organizing portion performing, when the similar search condition information detector detects a piece of the search condition information indicating the similar search condition, at least one of the following organization processes:
a first organization process of causing the search condition information nontransitory storage medium to store, as one piece of the search condition information, a piece of information indicating the new search condition, and to delete, from the search condition information nontransitory storage medium, the detected piece of search condition information, and
a second organization process of causing the search condition information nontransitory storage medium to store, as one piece of the search condition information, a piece of information indicating a search condition specifying a range, the range being overlap between an extent of the new search condition and an extent of the search condition similar to the new search condition, and to delete, from the search condition information nontransitory storage medium, the detected piece of search condition information.

2. The data management device according to claim 1, wherein the similar search condition information detector detects, as the piece of search condition information indicating the similar search condition, any one of the piece of search condition information indicating a search condition specifying a range that is a proper subset of the extent of the new search condition, the piece of search condition information indicating a search condition specifying a range where the extent of the new search condition is a proper subset, and the piece of search condition information indicating a search condition specifying a range covering a part of the extent of the new search condition.

3. The data management device according to claim 1, further comprising a selection screen displaying portion displaying a selection screen on which the user selects any of the first organization process, and the second organization process,
wherein the organizing portion performs the organization process thus selected by the user.

4. The data management device according to claim 1, further comprising a search condition information adding portion causing, when a new search condition is designated by a user and the new search condition does not match any of the search conditions indicated in any pieces of the search condition information, the search condition information storage portion to store a piece of information indicating the new search condition as one piece of the search condition information.

5. A data management device comprising:
a search condition information nontransitory storage medium storing one or more pieces of search condition information, each piece of the search condition information indicating a search condition;
a data retrieval portion retrieving, from a storage medium, when a piece of the search condition information is designated, data satisfying the search condition indicated in the piece of the search condition information;
a similar search condition information detector comparing, when a new search condition is designated by a user, first result information indicating data retrieved from the storage medium based on the new search condition with second result information indicating data retrieved from the storage medium based on the search condition indicated in a piece of the search condition information, thereby to detect, as a piece of similar search condition information indicating a similar search condition that is similar to the new search condition, a piece of the search condition information on the second result information similar to the first result information; and
an organizing portion performing, when the similar search condition information detector detects a piece of the similar search condition information, at least one of the following organization processes:
a first organization process of causing the search condition information nontransitory storage medium to store, as one piece of the search condition information, a piece of information indicating the new search condition, and to delete the detected piece of similar search condition information from the search condition information nontransitory storage medium, and
a second organization process of causing the search condition information nontransitory storage medium to store, as one piece of the search condition information, a piece of information indicating a search condition specifying a range, the range being overlap between an extent of the new search condition and an extent of the search condition similar to the new search condition, and to delete the detected piece of similar search condition information from the search condition information nontransitory storage medium.

6. The data management device according to claim 5, further comprising a search condition information adding portion causing, when a new search condition is designated by a user and the new search condition does not match any of the search conditions indicated in any pieces of the search condition information, the search condition information storage portion to store a piece of information indicating the new search condition as one piece of the search condition information.

7. A data management device comprising:
    a search condition information nontransitory storage medium storing a plurality of pieces of search condition information, each piece of the search condition information indicating a search condition;
    a data retrieval portion retrieving, from a storage medium, when a piece of the search condition information is designated, data satisfying the search condition indicated in the piece of the search condition information;
    a similar search condition information extracting portion comparing a first search result indicating data retrieved from the storage medium with a second search result indicating data retrieved from the storage medium based on the search condition indicated in a piece of the search condition information, thereby to detect, from the search condition storage portion, a piece of first search condition information indicating a search condition leading to the first search result and a piece of second search condition information indicating a search condition leading to the second search result, the first search result and the second search result being similar to each other; and
    an organizing portion performing, when the similar search condition information extracting portion detects a piece of the first search condition information and a piece of the second search condition information, at least one of the following organization processes:
    a first organization process of deleting the detected piece of first search condition information, and
    a second organization process of causing the search condition information nontransitory storage medium to store, as one piece of the search condition information, a piece of information indicating a search condition specifying a range, the range being overlap between an extent of the search condition indicated in the detected piece of first search condition information and an extent of the search condition indicated in the detected piece of second search condition information, and to delete, from the search condition information nontransitory storage medium, the detected piece of first search condition information and the detected piece of second search condition information.

8. The data management device according to claim 7, further comprising a search condition information adding portion causing, when a new search condition is designated by a user and the new search condition does not match any of the search conditions indicated in any pieces of the search condition information, the search condition information storage portion to store a piece of information indicating the new search condition as one piece of the search condition information.

9. A method for managing search condition information in a device, the device including a search condition information nontransitory storage medium storing one or more pieces of search condition information, each piece of the search condition information indicating a search condition, and a data retrieval portion retrieving, from a storage medium, when a piece of the search condition information is designated, data satisfying the search condition indicated in the piece of the search condition information, the method comprising:
    detecting, when a new search condition is designated by a user, a piece of the search condition information indicating a search condition similar to the new search condition; and
    performing, when a piece of the search condition information indicating the search condition similar to the new search condition is detected, at least one of the following organization processes:
    a first organization process of causing the search condition information nontransitory storage medium to store, as one piece of the search condition information, a piece of information indicating the new search condition, and to delete, from the search condition information nontransitory storage medium, the detected piece of search condition information, and
    a second organization process of causing the search condition information nontransitory storage medium to store, as one piece of the search condition information, a piece of information indicating a search condition specifying a range, the range being overlap between an extent of the new search condition and an extent of the search condition similar to the new search condition, and to delete, from the search condition information nontransitory storage medium, the detected piece of search condition information.

10. The method for managing search condition information in a device according to claim 9, the method further comprising, when the new search condition does not match any of the search conditions indicated in the search condition information stored in the search condition information nontransitory storage medium, causing the search condition information nontransitory storage medium to store information indicating the new search condition as the search condition information.

11. A method for managing search condition information in a device, the device including a search condition information nontransitory storage medium storing one or more pieces of search condition information, each piece of the search condition information indicating a search condition, and a data retrieval portion retrieving, from a storage medium, when a piece of the search condition information is designated, data satisfying the search condition indicated in the piece of the search condition information, the method comprising:
    comparing, when a new search condition is designated by a user, first result information indicating data retrieved from the storage medium based on the new search condition with second result information indicating data retrieved from the storage medium based on the search condition indicated in a piece of the search condition information, thereby to detect, as a piece of similar search condition information indicating the search condition similar to the new search condition, a piece of the search condition information on the second result information similar to the first result information; and
    when the similar search condition information indicating the search condition similar to the new search condition is detected, performing at least one of the following organization processes:
    a first organization process of causing the search condition information nontransitory storage medium to store, as one piece of the search condition information, a piece of information indicating the new search condition, and to delete the detected piece of similar search condition information from the search condition information nontransitory storage medium, and
    a second organization process of causing the search condition information nontransitory storage medium to store, as one piece of the search condition information, a piece of information indicating a search condition specifying a range, the range being overlap between an extent of the new search condition and an extent of the search condition similar to the new search condition, and to delete the detected piece of similar search condition information from the search condition information nontransitory storage medium.

12. The method for managing search condition information in a device according to claim 11, the method further comprising, when the new search condition does not match any of the search conditions indicated in the search condition information stored in the search condition information nontransitory storage medium, causing the search condition information nontransitory storage medium to store information indicating the new search condition as the search condition information.

13. A method for managing search condition information in a device, the device including a search condition information nontransitory storage medium storing a plurality of pieces of search condition information, each piece of the search condition information indicating a search condition, and a data retrieval portion retrieving, from a storage medium, when a piece of the search condition information is designated, data satisfying the search condition indicated in the piece of the search condition information, the method comprising:

comparing a first search result indicating data retrieved from the storage medium with a second search result indicating data retrieved from the storage medium based on the search condition indicated in a piece of the search condition information, thereby to detect, from the search condition storage portion, a piece of first search condition information indicating a search condition leading to the first search result and a piece of second search condition information indicating a search condition leading to the second search result, the first search result and the second search result being similar to each other; and when a piece of the first search condition information and a piece of the second search condition information are detected, performing at least one of the following organization processes:

a first organization process of deleting the detected piece of first search condition information, and a second organization process of causing the search condition information nontransitory storage medium to store, as one piece of the search condition information, a piece of information indicating a search condition specifying a range, the range being overlap between an extent of the search condition indicated in the detected piece of first search condition information and an extent of the search condition indicated in the detected piece of second search condition information, and to delete, from the search condition information nontransitory storage medium, the detected piece of first search condition information and the detected piece of second search condition information.

14. The method for managing search condition information in a device according to claim 13, the method further comprising, when the new search condition does not match any of the search conditions indicated in the search condition information stored in the search condition information nontransitory storage medium, causing the search condition information storage medium to store information indicating the new search condition as the search condition information.

\* \* \* \* \*